US012681412B2

(12) United States Patent
Hirano

(10) Patent No.: US 12,681,412 B2

(45) Date of Patent: Jul. 14, 2026

(54) IMAGE FORMING APPARATUS AND IMAGE FORMING SYSTEM THAT MANUFACTURES BOOKLETS BY HEATING MULTIPLE SHEETS

(71) Applicant: CANON KABUSHIKI KAISHA, Tokyo (JP)

(72) Inventor: Yuya Hirano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/751,521

(22) Filed: Jun. 24, 2024

(65) Prior Publication Data

US 2025/0004402 A1 Jan. 2, 2025

(30) Foreign Application Priority Data

Jun. 28, 2023 (JP) ................................ 2023-106202

(51) Int. Cl.
*G03G 15/20* (2006.01)
*G03G 15/00* (2006.01)

(52) U.S. Cl.
CPC ....... *G03G 15/205* (2013.01); *G03G 15/2064* (2013.01); *G03G 15/5004* (2013.01); *G03G 2215/00936* (2013.01); *G03G 2215/00978* (2013.01)

(58) Field of Classification Search
USPC ............................................................ 399/69
See application file for complete search history.

(56) References Cited

U.S. PATENT DOCUMENTS 6,577,845 B2 * 6/2003 Stevens ................. B42C 9/0081 270/58.08
7,260,354 B2 * 8/2007 Ishida ................ G03G 15/2064 399/407
7,281,707 B2 * 10/2007 Moriyama ................ B42C 1/12 270/58.08
8,838,014 B2 * 9/2014 Matsue .............. G03G 15/6544 399/408
2010/0310267 A1 * 12/2010 Shimura ................ G03G 15/80 399/69
2013/0051886 A1 * 2/2013 Watanabe .......... G03G 15/6544 399/409
2015/0043934 A1 * 2/2015 Itoh ...................... G03G 15/205 399/70

FOREIGN PATENT DOCUMENTS

JP 5361505 B2 12/2013

* cited by examiner

*Primary Examiner* — Quana Grainger
(74) *Attorney, Agent, or Firm* — ROSSI, KIMMS & McDOWELL LLP

(57) ABSTRACT

An image forming unit forms an image on a sheet using toner. A fixing unit includes a first heater that fixes the image to the sheet. A booklet manufacturing unit manufactures a booklet by heating a plurality of sheets that have passed through the fixing unit using a second heater and bonding together the plurality of sheets. Power is supplied to the first heater and the second heater through an inlet. A first detection circuit that detects an inlet current flowing through the inlet. A control circuit controls adjusts the power supplied to the second heater so that the inlet current does not exceed a rated value on a basis of the inlet current detected by the first detection circuit.

21 Claims, 14 Drawing Sheets

IMAGE FORMING APPARATUS AND IMAGE FORMING SYSTEM THAT MANUFACTURES BOOKLETS BY HEATING MULTIPLE SHEETS

BACKGROUND OF THE INVENTION

Field of the Invention

The present invention relates to an image forming apparatus and an image forming system that manufactures booklets by heating multiple sheets.

Description of the Related Art

A printer system may include an image forming apparatus that fixes a toner image to a sheet via a fixing heater and an optional apparatus that binds a sheet bundle via a stapler. The stapler requires a large current when operated, but the consumption current of the printer system cannot exceed a standard value specified by laws and regulations. According to Japanese Patent No. 5361505, an image forming apparatus receives a stapler usage notice from an optional apparatus and reduces the power supplied to the fixing heater if the consumption current exceeds a standard value.

However, since the amount of time it takes for a drive current to flow to the stapler is very short, the amount of time it takes reduce the power supplied to the fixing heater may also be very short. With a booklet manufacturing apparatus that does not use staples and instead uses a heater for booklet manufacturing that binds a sheet bundle using an adhesive toner, the time during which the power supplied to the fixing heater is reduced is a long time. This is because, compared to the stapler operation time, the amount of time require to activate the heater for booklet manufacturing is longer. When the power supplied to the fixing heater is reduced, the amount of time required to raise the temperature of the fixing heater to a target temperature is increased. As a result, the amount of time required to form a toner image on a sheet is also increased.

SUMMARY OF THE INVENTION

The disclosure provides an image forming apparatus comprising: an image forming unit that forms an image on a sheet using toner; a fixing unit including a first heater that fixes the image to the sheet; a booklet manufacturing unit that manufactures a booklet by heating a plurality of sheets that have passed through the fixing unit using a second heater and bonding together the plurality of sheets; an inlet through which power is supplied to the first heater and the second heater; a first detection circuit that detects an inlet current flowing through the inlet; and a control circuit that controls the power supplied from the inlet to the first heater and the second heater, wherein the control circuit adjusts the power supplied to the second heater so that the inlet current does not exceed a rated value on a basis of the inlet current detected by the first detection circuit.

Further features of the present invention will become apparent from the following description of exemplary embodiments (with reference to the attached drawings).

DESCRIPTION OF THE EMBODIMENTS

Figure 1:
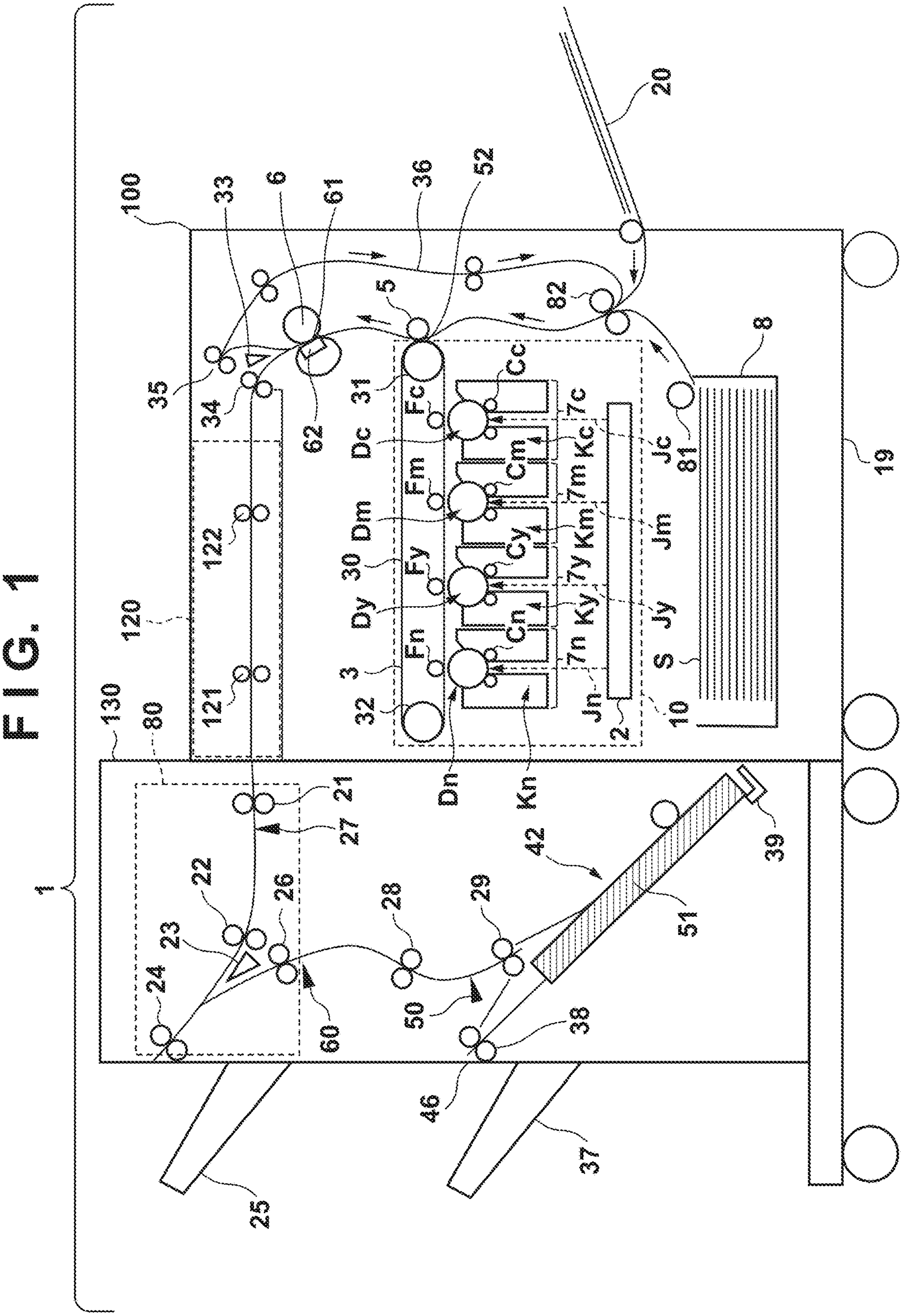
FIG. 1 is a diagram for explaining an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment (1) Image Forming System

As illustrated in FIG. 1, an image forming system 1 includes an image forming apparatus 100 and a post-processing apparatus 130. The post-processing apparatus 130 is a sheet handling apparatus connected to the image forming apparatus 100. The image forming apparatus 100 forms an image on a sheet S, a printing material. An intermediate conveyance unit 120 conveys the sheet S with a formed image to the post-processing apparatus 130. The post-processing apparatus 130 performs post-processing on the sheet S as necessary and outputs the sheet S.

The image forming apparatus 100 includes a sheet cassette 8, an image forming portion 10, a fixing device 6, and a casing 19 that houses these. The image forming portion 10 forms a toner image on the sheet S fed from the sheet cassette 8. The fixing device 6 performs a fixing process to fix the toner image on the sheet S.

The sheet cassette 8 is provided on the lower portion of the image forming apparatus 100. The sheet cassette 8 is inserted into the casing 19 in a removable manner and can house a plurality of the sheets S. A conveyance roller 81 feeds the sheets S from the sheet cassette 8 and passes the sheets S to a conveyance roller pair 82. The sheets S can also be fed one at a time from a multi-tray 20.

The image forming portion 10 is a tandem electrophotographic unit includes four process cartridges 7*n*, 7*y*, 7*m*, 7*c*, an exposure apparatus 2, and a transfer unit 3. "y", "m", and "c" correspond to yellow, magenta, and cyan, respectively. n refers to the adhesive toner. The color of the adhesive toner may be transparent or black. In a case where the color of the adhesive toner is transparent, black achieved by appropriately mixing yellow, magenta, and cyan (process black). The process cartridges 7*n*, 7*y*, 7*m*, 7*c* include integrally replaceable components involved in the image forming process. In other words, a plurality of components are integrally formed to form the process cartridges 7*n*, 7*y*, 7*m*, 7*c*.

The process cartridges 7*n*, 7*y*, 7*m*, 7*c* each include, respectively, a corresponding developing apparatus Kn, Ky, Km, Kc, photosensitive drum Dn, Dy, Dm, Dc, and charging roller Cn, Cy, Cm, and Cc. Except for the toner type, the process cartridges 7*n*, 7*y*, 7*m*, 7*c* share essentially the same structure.

The developing apparatuses Ky, Km, Kc respectively house yellow, magenta, and cyan toner for forming a visual image on the sheet S. The developing apparatus Kn houses an adhesive toner Tn. The adhesive toner Tn is used in forming a user image (document image) and the thermo-compression bonding of a plurality of the sheets S in the post-processing apparatus 130. Note that an image formed by the adhesive toner Tn is formed on a photosensitive drum Dn by developing the adhesive toner Tn.

The image forming portion 10 may include a fifth process cartridge that uses toner for bonding or black toner. Note that depending on the application of the image forming apparatus 100, the type and number of the printing toners can be changed.

The charging rollers Cn, Cy, Cm, and Cc are charging devices that uniformly charge the surface of their corresponding photosensitive drum Dn, Dy, Dm, Dc. The exposure apparatus 2 is disposed below the process cartridges 7*n*, 7*y*, 7*m*, 7*c* and above the sheet cassette 8. The exposure apparatus 2 emits laser beams Jn, Jy, Jm, and Jc at the corresponding photosensitive drums Dn, Dy, Dm, and Dc to form electrostatic latent images. The exposure apparatus 2 may be referred to as an optical scanning apparatus.

The developing apparatuses Kn, Ky, Km, Kc adhere toner to the electrostatic latent images on the photosensitive drums Dn, Dy, Dm, and Dc to form toner images. The developing apparatuses Kn, Ky, Km, Kc may be referred to as developing devices.

The transfer unit 3 includes a transfer belt 30 that functions as an intermediate transfer body (secondary image carrier). The transfer belt 30 is an endless belt installed on an inner roller 31 and a tensioning roller 32. The outer circumferential surface (image forming surface) of the transfer belt 30 faces the photosensitive drums Dn, Dy, Dm, and Dc. Primary transfer rollers Fn, Fy, Fm, and Fc are disposes so that the inner circumferential side of the transfer belt 30 faces the photosensitive drums Dn, Dy, Dm, and Dc.

The primary transfer rollers Fn, Fy, Fm, and Fc transfer the toner images from the corresponding photosensitive drum Dn, Dy, Dm, and Dc to the transfer belt 30. The primary transfer rollers Fn, Fy, Fm, and Fc may be referred to as primary transfer devices. When the transfer belt 30 rotates anticlockwise, the toner images are conveyed to the secondary transfer unit.

A secondary transfer roller 5 is disposed facing the inner roller 31, forming a transfer nip 52 between the secondary transfer roller 5 and the transfer belt 30. The transfer nip 52 transfers the toner images from the transfer belt 30 to the sheet S. The transfer nip 52 may be referred to as a secondary transfer unit.

The fixing device 6 is disposed above (on the downstream side in the conveyance direction of the sheet S) the secondary transfer roller 5. The fixing device 6 applies heat and pressure to the sheet S passing through a fixing nip 61. This fixes the toner image on the sheet S. Note that the fixing device 6 includes a fixing heater 62 for heating the toner image and the sheet S. The fixing heater 62 is a halogen heater or a ceramic heater, for example.

Figure 2A:
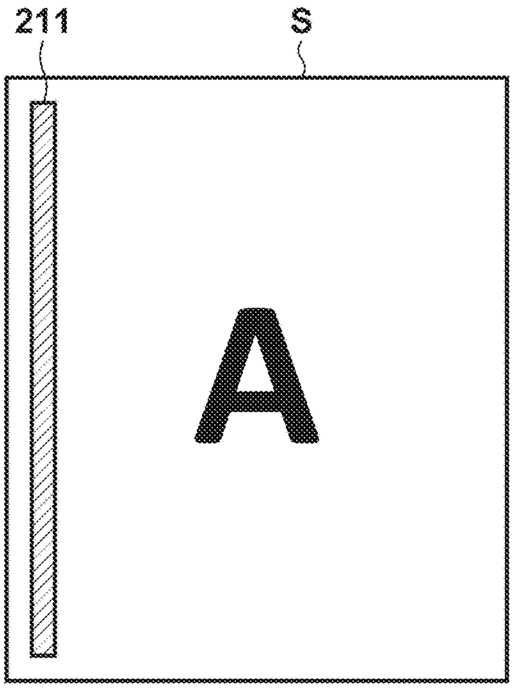
FIGS. 2A and 2B are diagrams for explaining a region where adhesive toner is applied.

FIG. 2A illustrates a print region 211 of the adhesive toner Tn. The print region 211 extends parallel with the long side of the sheet S. The print region 211 is provided at an end portion near a long side. Accordingly, by layering the plurality of sheets S and applying heat and pressure to the print region 211 of the plurality of sheets S, the post-processing apparatus 130 bonds the plurality of sheets S together and forms a booklet. The booklet in this case is a booklet with a long edge binding. Here, the width (length in the short side direction) of the adhesive toner image (the print region 211) is 4.0 mm, for example.

Figure 2B:
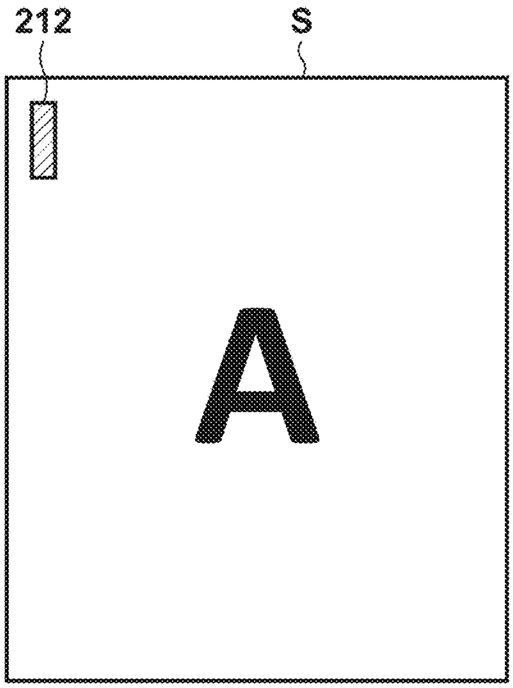

As illustrated in FIG. 2B, near the corners of the sheet S, a small print region 212 for the adhesive toner Tn may be formed. In this case, a corner bound booklet is made. The image from the adhesive toner Tn is not formed on the sheet S corresponding to the cover of the booklet.

Now we will return to the description of FIG. 1. As illustrated in FIG. 1, a switch guide 33, which is a flap-like guide member, is provided on the upstream side of the fixing device 6 in the conveyance direction of the sheet S. When one-sided printing mode for forming an image on one side of the sheet S is selected, the switch guide 33 guides the sheet S to discharge rollers 34. When double-sided printing mode for forming an image on both sides of the sheet S is selected, the switch guide 33 guides the sheet S after an image has been formed on the first surface to a switch back roller pair 35. The switch back roller pair 35 conveys the sheet S in a first direction. When the back end of the sheet S is put in a state where it can enter a double-sided conveying path 36, the switch back roller pair 35 starts rotating in reverse. This conveys the sheet S to the double-sided conveying path 36. The double-sided conveying path 36 conveys the sheet S once again to the secondary transfer unit. In this manner, an image is formed on the second surface of the sheet S.

The discharge rollers 34 convey the sheet S to the intermediate conveyance unit 120. The intermediate conveyance unit 120 includes a conveyance roller pair 121, 122. The conveyance roller pair 121, 122 convey the sheet S to the post-processing apparatus 130.

(2) Post-processing Apparatus

The post-processing apparatus 130 is a floor-standing sheet handling apparatus. The post-processing apparatus 130 has a function for buffering the plurality of sheets S, a function for aligning the plurality of sheets S, and a function for bonding together a sheet bundle.

Hereinafter, the end portion of the sheet S on the front side in the conveyance direction will be referred to as the front end. The end portion of the sheet S on the back side in the conveyance direction will be referred to as the back end. Of the two end portions of the sheet S, the end which enters the post-processing apparatus 130 before the other is referred to as the first end. Of the two end portions of the sheet S, the end which enters the post-processing apparatus 130 after the other is referred to as the second end. Note that when the post-processing apparatus 130 performs switch back conveying, the front end may change from the first end to the second end, and the back end may change from the second end to the first end.

The sheet S conveyed from the intermediate conveyance unit 120 is passed to an inlet roller 21 of the post-processing apparatus 130. A sheet sensor 27 referred to as an inlet sensor is disposed downstream from the inlet roller 21. When the sheet sensor 27 detects the back end of the sheet S, a conveyance roller pair 22 accelerate the sheet S. When the back end of the sheet S with an upper tray 25 set as the discharge destination arrives between the conveyance roller pair 22 and a conveyance roller pair 24, the conveyance roller pair 22 decelerates. Accordingly, the conveyance speed of the sheet S is made to match a predetermined discharge speed. The conveyance roller pair 22 discharges the sheet S to the upper tray 25.

When the back end of the sheet S with a lower tray 37 set as the discharge destination passes a backflow prevention valve 23, the conveyance roller pair 22 stops conveying the sheet S. Thereafter, the conveyance roller pair 22 starts rotating in reverse. Accordingly, the sheet S is switched back and conveyed to a conveyance roller pair 26. When the front end of the sheet S is detected by a sheet sensor 60 provided downstream from the conveyance roller pair 26, the two rollers forming the conveyance roller pair 24 separate from one another. This allows the subsequent sheet S to be received by the conveyance roller pair 24. Also, with the preceding sheet S held between the conveyance roller pair 26, the conveyance roller pair 26 stop. Coinciding with the arrival of the subsequent sheet S, the conveyance roller pair 26 starts rotating in reverse. Accordingly, the subsequent sheet S is layered on top of the preceding sheet S. By the conveyance roller pair 26 repeatedly performing switch back on the sheets S, the plurality of sheets S are layered, forming a sheet bundle. Such an operation for forming a sheet bundle may be referred to as a buffering operation. The unit that implements the buffering operation may be referred to as a buffering portion 80.

When the sheet bundle is completed at the buffering portion 80, the conveyance roller pair 26 convey the sheet bundle to an intermediate stacker 42. The sheet bundle passes a conveyance roller pair 28 and a sheet sensor 50. Also, the sheet bundle is conveyed to the intermediate stacker 42 by a kick-out roller 29. A movable vertical alignment plate 39 is disposed at the most downstream portion of the intermediate stacker 42 in a standby position. By abutting the sheet bundle against the vertical alignment plate 39, the sheet bundle is aligned.

A plurality of sheet bundles are stacked in order at the intermediate stacker 42. Accordingly, a predetermined number of the sheets S for forming a booklet are stacked at the intermediate stacker 42. When the alignment of the predetermined number of sheets S ends, a thermocompression bonding unit 51 performs a binding operation (thermocompression bonding process) to form a booklet. When the vertical alignment plate 39 moves from the standby position to the discharge position, the booklet is pushed toward discharge rollers 38. When the front end of the booklet is held between the discharge rollers 38, the vertical alignment plate 39 stops and then returns to the standby position. The discharge rollers 38 discharge the booklet received from the vertical alignment plate 39 from a discharge opening 46 to the lower tray 37.

As described above, using the buffering portion 80, the post-processing apparatus 130 forms a sheet bundle made from the plurality of sheets S and conveys the sheet bundle to the intermediate stacker 42. However, one sheet S may be conveyed to the intermediate stacker 42.

(3) Booklet Manufacturing Operation

FIGS. 3A to 3D illustrate a booklet manufacturing operation executed by the intermediate stacker 42. In the initial state, the intermediate stacker 42 is empty. As an example, a sheet bundle W including five sheets S is conveyed from the buffering portion 80 to the intermediate stacker 42.

A Y direction is the direction parallel with the stacking surface (stacking plate) for the sheets S at the intermediate stacker 42 and the direction parallel with the conveyance direction in which the sheets S are conveyed from the kick-out roller 29 to the intermediate stacker 42. The Y direction may be referred to as the vertical direction. An X direction is the direction parallel with the stacking surface of the sheets S at the intermediate stacker 42 and orthogonal to the Y direction. The X direction may be referred to as the horizontal direction. AZ direction is the direction orthogonal to the X direction and the Y direction (normal direction of the stacking surface, thickness direction of the stacked sheets S). The Z direction may be referred to as the height direction. The opposite directions of the X direction, the Y direction, and the Z direction may be referred to as the −X direction, the −Y direction, and the −Z direction, respectively.

The vertical alignment plate 39 and a vertical alignment roller 40 function as a first alignment unit that aligns the sheets S in the first direction (Y direction). The vertical alignment plate 39 is disposed at the most downstream portion of the intermediate stacker 42 in the Y direction. The vertical alignment plate 39 is a reference member (first reference member) corresponding to the reference for the sheet position in the Y direction. The vertical alignment roller 40 is a conveying member that conveys the sheets S in the Y direction to abut the sheets S with the vertical alignment plate 39 and align them. The vertical alignment plate 39 includes a plurality of abutting portions 39*a* to 39*c* disposed at intervals in the X direction. The plurality of abutting portions 39*a* to 39*c* come into contact with the end portions of the sheets S. Note that the vertical alignment plate 39 and the vertical alignment roller 40 are integrally formed as a movable unit 59 that can move in the Y direction. The movable unit 59 can move in the Y direction via a drive source such as a motor. In other words, the position of the vertical alignment plate 39 and the vertical alignment roller 40 can be adjusted in the Y direction. Horizontal alignment joggers 41*a* to 41*c* function as a second alignment unit that aligns sheets in the second direction (X direction) orthogonal to the first direction.

The horizontal alignment joggers 41*a* to 41*c* move in the X direction via a drive source such as a motor and press against the side ends of the sheets S stacked in the intermediate stacker 42. Horizontal alignment plates 72*a* and 72*b* are reference members corresponding to the reference for the position of the sheets S in the X direction. The horizontal alignment plates 72*a* and 72*b* are disposed facing the horizontal alignment joggers 41*a* and 41*b* in the X direction.

(3-1) Preparation Stage

Figure 3A:
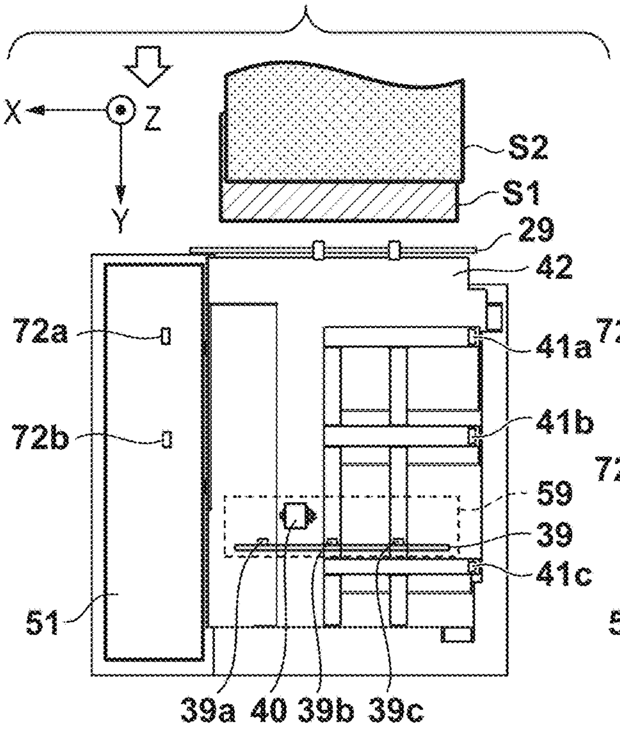
FIGS. 3A to 3D are plan diagrams for explaining a thermocompression bonding unit.

As illustrated in FIG. 3A, the sheets S1 to S5 are conveyed toward the kick-out roller 29. The sheets S1 to S5 may be conveyed to the intermediate stacker 42 in a state where the sheet Si located lower down is jutting out in the Y direction past the sheet Si+1 located higher up. Here, i is the index for the sheets S. Before the sheets S are stacked at the intermediate stacker 42, the vertical alignment plate 39 matches the size of the sheets S to be aligned and moves to a predetermined standby position. The standby position is set so that the end portion positions of the sheets S are constant in the −Y direction, irrespective of the size of the sheets S. In other words, the standby position is a position whereby the distance in the Y direction from the nip position of the kick-out roller 29 to the vertical alignment plate 39 is slightly longer than the length of the sheets in the Y direction. The horizontal alignment joggers 41*a* to 41*c* wait at a position separated outward in the X direction from the sheets S being conveyed so as to not interfere with the conveying of the sheets S.

(3-2) Vertical Alignment Stage

Figure 3B:
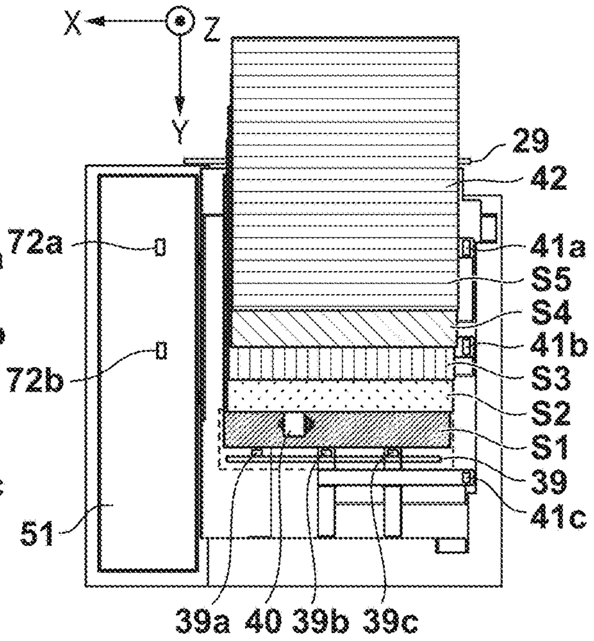

FIG. 3B illustrates the back end of the first sheet S1 having passed the nip of the kick-out roller 29, and the front end of the sheet S1 arriving at the vertical alignment roller 40. The sheet S1 abuts the vertical alignment plate 39 and is aligned using the position of the vertical alignment plate 39 as the reference. By continuously rotating the vertical alignment roller 40, following on from the sheet S1, the sheets S2 to S5 arriving at the vertical alignment roller 40 are abutted in order with the vertical alignment plate 39. Accordingly, the five sheets S1 to S5 are aligned in the Y direction (vertical direction) using the position of the vertical alignment plate 39 as the reference.

(3-3) Horizontal Alignment Stage

Figure 3C:
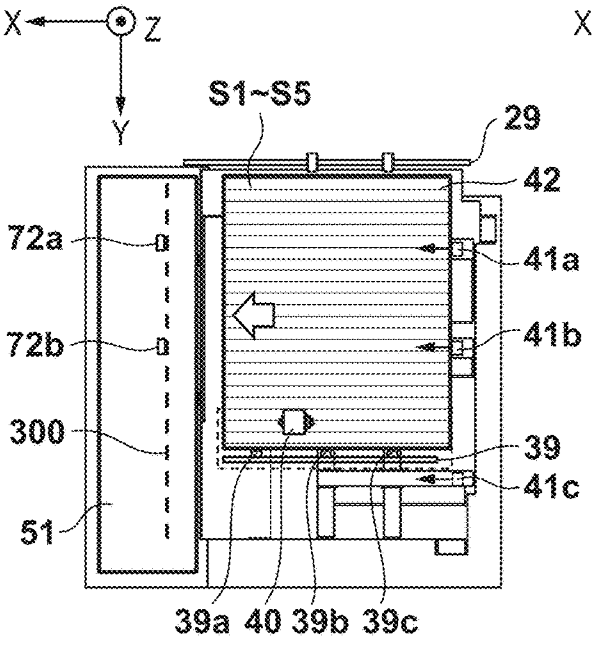

FIG. 3C illustrates alignment in the X direction (horizontal direction) having started after the alignment in the Y direction (vertical direction) of the sheets S1 to S5 has been completed. The horizontal alignment joggers 41*a* to 41*c* are driven in the X direction, the alignment direction, abutted against the side ends of the sheets S1 to S5, and push the sheets S1 to S5 toward the horizontal alignment plates 72*a* and 72*b*. Then, by abutting the other side ends of the sheets S1 to S5 against an abutting surface 300 of the horizontal alignment plates 72*a* and 72*b*, the sheets S1 to S5 are aligned in the X direction (horizontal direction) using the position of the horizontal alignment plates 72*a* and 72*b* as the reference.

(3-4) Bonding Stage (Thermocompression Bonding Stage)

Figure 3D:
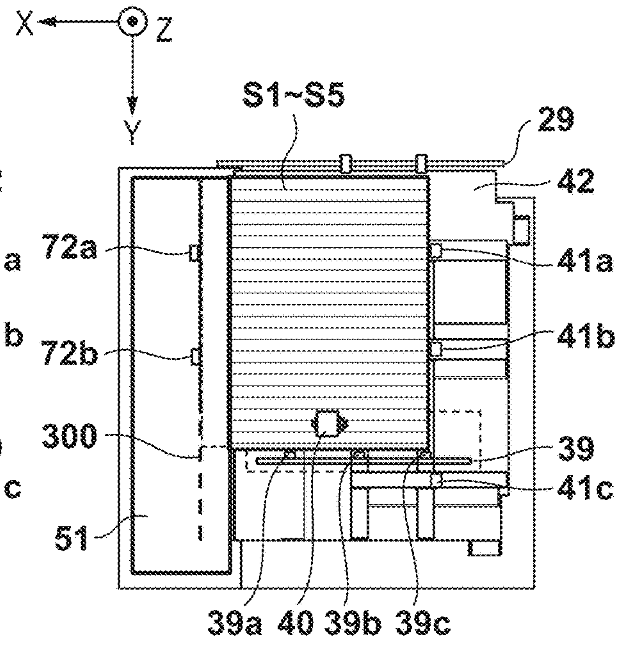

FIG. 3D illustrates the state when aligning the five sheets S1 to S5 in the X direction and the Y direction is complete. The target position (alignment position) in the alignment operation is the position of the sheet bundle W for when the bonding process (thermocompression bonding) is performed by the thermocompression bonding unit 51. As described above, the image forming apparatus 100 applies the adhesive toner Tn to the sheets S1 to S5 so that the side where the adhesive toner image is formed is on the side of the thermocompression bonding unit 51. In a case where the sheet S1 is the cover of the booklet, the adhesive toner Tn is not applied.

The thermocompression bonding unit 51 performs the thermocompression bonding operation on the sheets S1 to S5 after alignment is complete. During this time, the horizontal alignment joggers 41*a* to 41*c* retract in the −X direction. Accordingly, the intermediate stacker 42 is put in a state in which the next plurality of sheets S can be received. Thereafter, the sheet bundle W including the sheets S6 to S10 generated at the buffering portion 80 are stacked on the sheets S1 to S5.

Thereafter, the four stages described above are repeated for the sheets S1 to S10. Accordingly, the sheets S1 to S10 are bonded in a highly-accurately aligned state.

As an example, the sheet bundle W includes five sheets S. However, the number of the sheets S forming the sheet bundle W may be two, three, or the like. In other words, the number of the sheets S included in the sheet bundle W is equal to or less than the maximum number of the sheets S that can be layered at the buffering portion 80.

(4) Thermocompression Bonding Unit

Figure 4A:
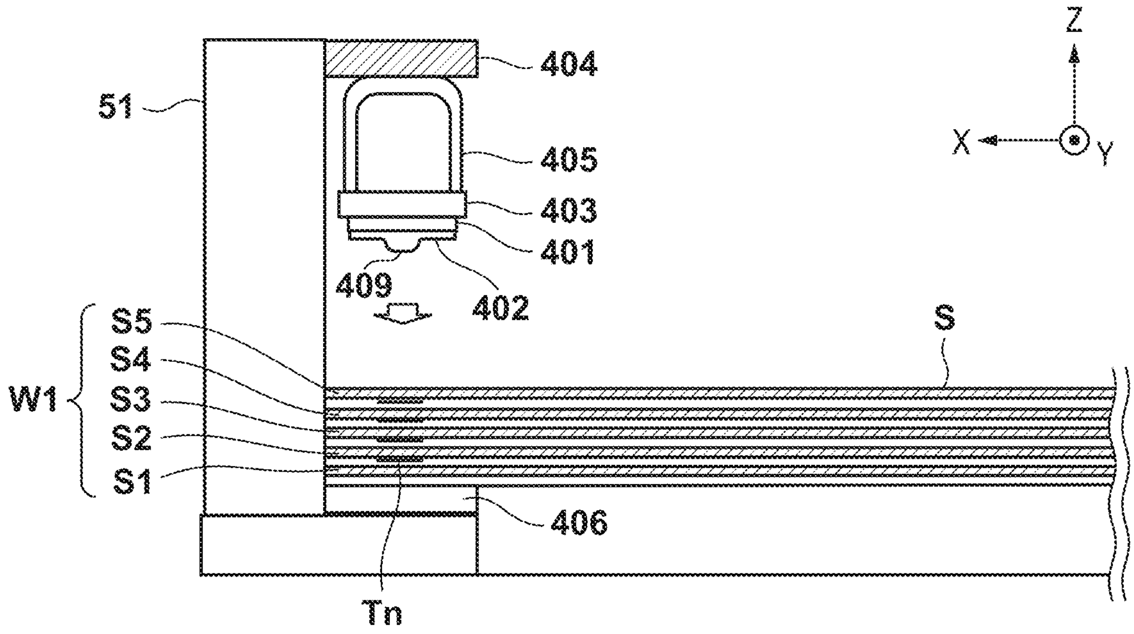
FIGS. 4A and 4B are diagrams for explaining a thermocompression bonding process.

As illustrated in FIG. 4A, the thermocompression bonding unit 51 includes a bonding heater 401 with an inbuilt heating element as a heat source and a heating plate 402 made of aluminum disposed above the bonding heater 401. The bonding heater 401 is a halogen heater or a ceramic heater, for example. The temperature of the bonding heater 401 may be controlled by a control circuit so that the temperature is measured by a temperature sensor and the measured temperature is at a target temperature. For example, the target temperature is set so that the surface temperature of a pressing portion 409 of the heating plate 402 is 200° C. By the heating plate 402 being provided with the pressing portion 409, the heat and pressure of the thermocompression bonding unit 51 can be concentrated at the binding position of the sheet bundle W. As a result, the heating and pressing efficiency is improved.

The bonding heater 401 is supported by a heater support 403 made of resin. A press lever 404 pushes the thermocompression bonding unit 51 down in the −Z direction (downward direction) and presses the sheet bundle W. The pressing force of the press lever 404 is transmitted to the pressing portion 409 via a metal stay 405 functioning as a rigid body. The pressing force of the press lever 404 can be controlled according to the amount the press lever 404 is moved in the −Z direction (downward direction). For example, the pressing force is 30 kgf. A pressing plate 406 is made of an elastic material (for example, silicone rubber). This is because the pressing plate 406 is a member for stably receiving the pressing force. The thermocompression bonding unit 51 pressing the sheet bundle W1 including the sheets S1 to S5 and thereafter separates from the sheet bundle W1. The sheets S1 to S5 illustrated in FIG. 4A are the first to fifth sheets of a booklet corresponding to the product. The sheet S1 is the cover of the booklet. Thus, an image of the adhesive toner Tn is not formed on the sheet S1. An image of the adhesive toner Tn is formed on the lower surface of the second sheet onward from S2 to S5 of the booklet.

Figure 4B:
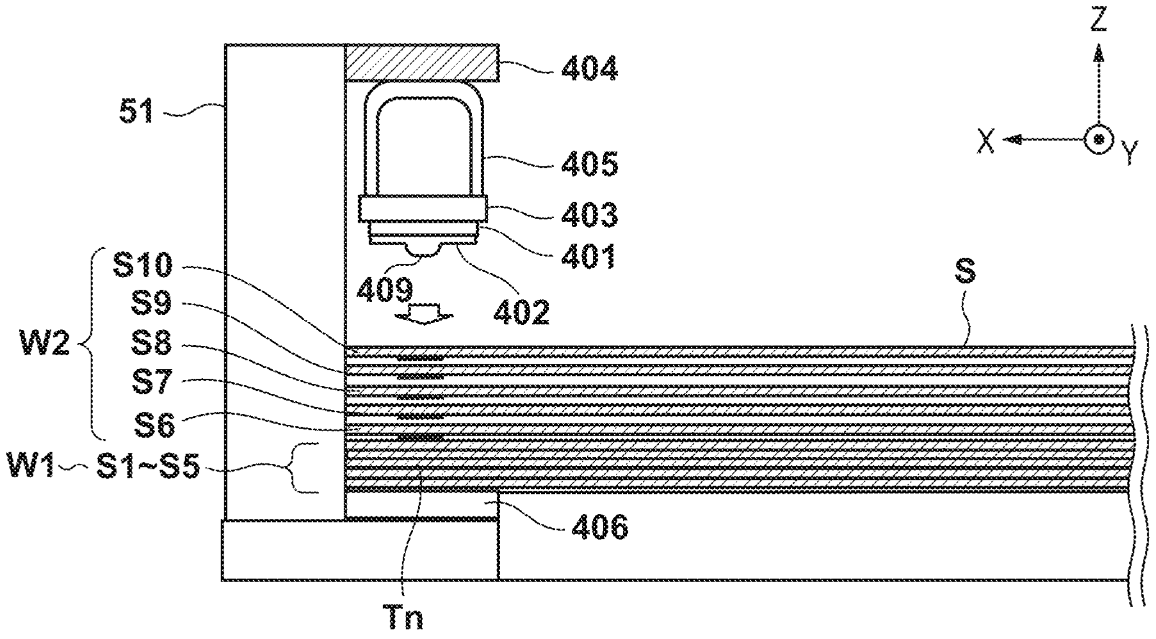

As illustrated in FIG. 4B, the sheet bundle W2 is stacked on the post-thermocompression-bonding sheets S1 to S5. The sheet bundle W2 includes the sheets S6 to S10. The thermocompression bonding unit 51 performs the thermocompression bonding operation on the sheet bundle W2 stacked on the sheet bundle W1. Accordingly, a booklet including many sheets S is prepared.

The sheets S6 to S10 stack after are included in the same booklet as the sheets S1 to S5. Thus, an image of the adhesive toner Tn is formed on each lower surface of the sheets S6 to S10.

As an example, the post-processing apparatus 130 can create a part of a booklet including a maximum of 100 sheets S. When booklet creation starts, the buffering portion 80 buffers the sheets S at a maximum of five at a time, creates the sheet bundle W, and then supplies the sheet bundle W to the intermediate stacker 42. The thermocompression bonding unit 51, each time the sheet bundle W arrives, performs the thermocompression bonding operation including the lowering operation, the pressing operation, and the raising operation. By repeating the buffering operation and the thermocompression bonding operation, booklets are efficiently created without a decrease in the productivity of the image forming apparatus 100.

When the thermocompression bonding operation on the sheet bundle W including the last page of the booklet is completed at the intermediate stacker 42, the vertical alignment plate 39 moves from the standby position to the discharge position. In other words, by the vertical alignment plate 39 moving in a translational manner toward the discharge opening 46, the completed booklet is pushed out. The discharge opening 46 is provided with the discharge rollers 38. When the front end of the booklet moves just past the discharge rollers 38, the vertical alignment plate 39 stops and then returns to the standby position. The discharge rollers 38 discharge the booklet to the lower tray 37.

(5) Control System

Figure 5:
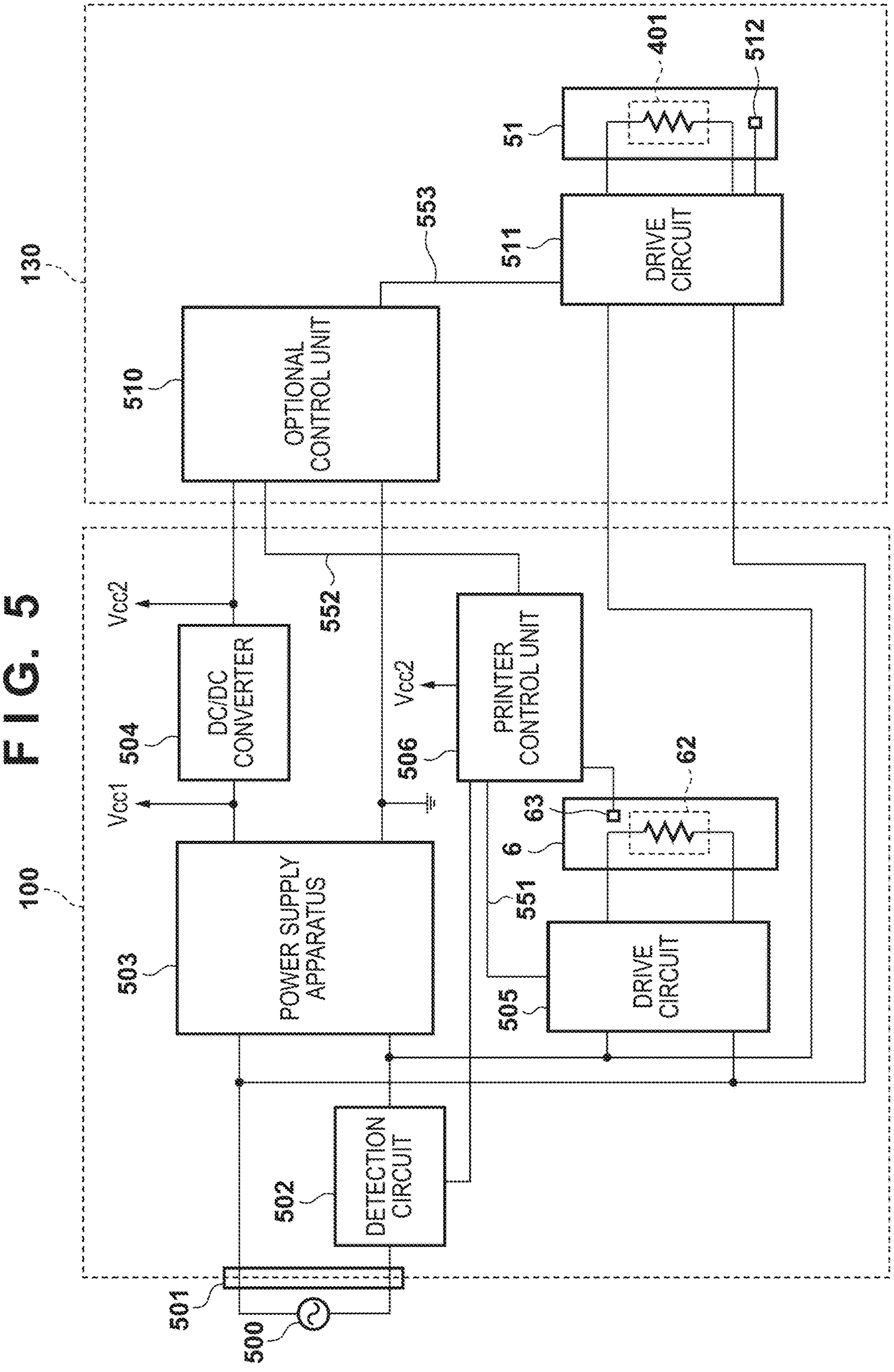
FIG. 5 is a diagram for explaining a control system.

FIG. 5 illustrates a circuit configuration of the image forming apparatus 100 and the post-processing apparatus 130 according to the first embodiment. An AC power supply 500 is a commercial AC power supply, for example. The power supplied from the AC power supply 500 is supplied to a power supply apparatus 503 and a drive circuit 505 provided in the image forming apparatus 100. The power supplied from the AC power supply 500 is also supplied to a drive circuit 511 provided in the post-processing apparatus 130. The power supply apparatus 503 is an AC/DC converter that converts the alternating current supplied from the AC power supply 500 into direct current. Vcc1 is a DC voltage generated by the power supply apparatus 503. The DC voltage Vcc1 is supplied to the motors that drive the conveyance rollers in the image forming apparatus 100 and the motors that drive the conveyance rollers in the post-processing apparatus 130. A DC/DC converter 504 is a power supply circuit that generates a DC voltage Vcc2 by stepping down the DC voltage Vcc1. The DC voltage Vcc2 is supplied to a printer control unit 506 and an optional control unit 510 provided in the post-processing apparatus 130.

The printer control unit 506 is a control circuit that comprehensively controls the image forming apparatus 100. The printer control unit 506 is connected to the drive circuit 505 via a control line 551. The printer control unit 506 controls the drive circuit 505 via the control line 551. For example, the printer control unit 506 sends a control signal to the drive circuit 505 to make the temperature detected by a temperature sensor 63 a target temperature. The drive circuit 505 controls the power supplied from the AC power supply 500 to the fixing heater 62 on the basis of the control signal supplied from the printer control unit 506. The drive circuit 505 is a switching circuit including a TRIAC that can turn the alternating current on and off, for example.

A detection circuit 502 is a circuit that detects the AC current (inlet current) input from an inlet 501. The inlet 501 may include a power supply plug that is inserted into the outlet of the AC power supply 500 and a power supply cable connected to the power supply plug, for example.

The printer control unit 506 communicates with the optional control unit 510 via a communication line 552. For example, the printer control unit 506 transmits a booklet manufacturing instruction (the number of sheets S for forming a booklet) to the optional control unit 510. The printer control unit 506 transmits a drive instruction for the bonding heater 401 to the optional control unit 510.

The optional control unit 510 controls the drive circuit 511 on the basis of the control instruction from the printer control unit 506. The drive circuit 511, on the basis of a control instruction, controls the alternating current supplied from the AC power supply 500 to the bonding heater 401 to make the temperature detected by a temperature sensor 512 a target temperature. The drive circuit 511 is also a switching circuit including a TRIAC that can turn the alternating current on and off. Note that the optional control unit 510 supplies a control signal to the drive circuit 511 via a signal line 553.

(6) Heater Power Control

The rated current that can be extracted from the power supply socket (outlet) of the AC power supply 500 is defined by the laws and regulations of each country (for example, the Japanese Electrical Appliances and Materials Safety law (PSE standard), the European EN standard, the US UL standard, and the like). For example, the rated current (hereinafter, referred to as standard value) supplied to an electrical appliance such as the image forming apparatus 100 is 15 amperes (A). Thus, it is necessary to design and control the image forming apparatus 100 so that an inlet current Iin does not exceed a standard value Ipse.

Figure 6A:
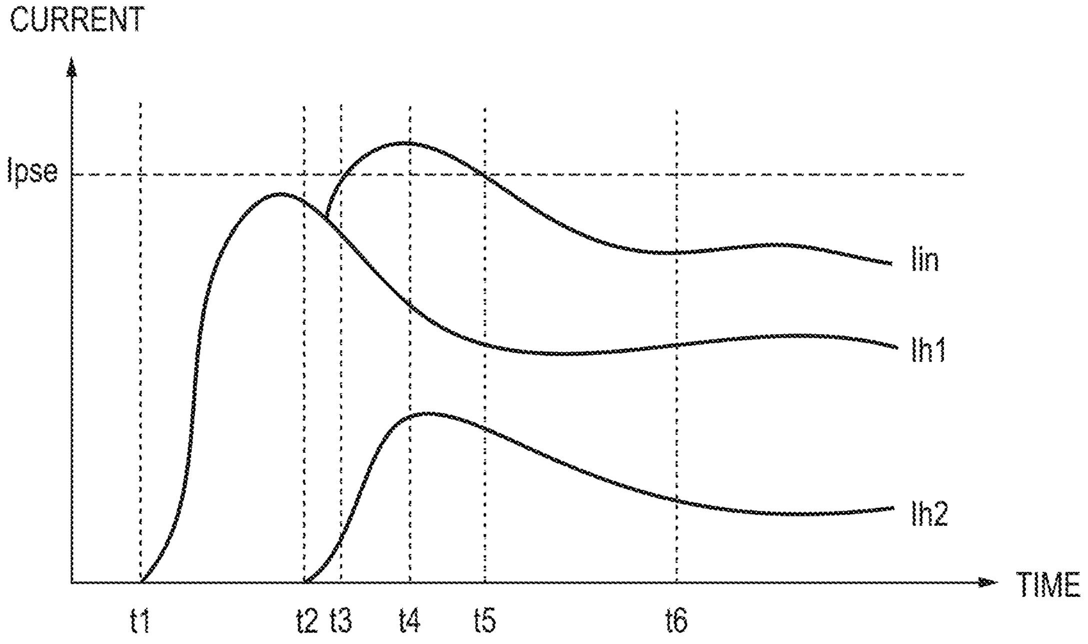
FIGS. 6A and 6B are diagrams for explaining changes in an inlet current and a heater current.

FIG. 6A illustrates an example in which power control is performed for the fixing heater 62 and the bonding heater 401 without taking into account the standard value Ipse. The transitions in processing as time passes is as follows.

At time t1, the image forming apparatus 100 and the post-processing apparatus 130 start a print operation. The printer control unit 506 starts supplying power to the fixing heater 62 and also starts conveying the sheet S. Iin is the inlet current. A heater current Ih1 is the current flowing through the fixing heater 62. A heater current Ih2 is the current flowing through the bonding heater 401.

At time t2, the printer control unit 506 sends an instruction to the optional control unit 510 so that power supply to the bonding heater 401 is started. The optional control unit 510 starts supplying power to the bonding heater 401 on the basis of this instruction.

Time t3 is the time when the inlet current Iin exceeds the standard value Ipse. To activate the bonding heater 401, a high amount of the heater current Ih2 is required.

At time t4, the sheet S arrives at the fixing device 6. Thus, the printer control unit 506 controls the heater current Ih1 to make the temperature of the fixing heater 62 reach the target temperature by time t4.

At time t5, the inlet current Iin drops below the standard value Ipse. This is caused by a decrease in both the heater current Ih1 and the heater current Ih2.

At time t6, the thermocompression bonding unit 51 performs the thermocompression bonding process on the sheet bundle W.

In this manner, the temperature of the fixing heater 62 is required to reach the target temperature by time t4. Also, the temperature of the bonding heater 401 is required to reach the target temperature by time t6. For this, at time t2, the printer control unit 506 starts supplying power to the bonding heater 401. From time t2 onward, both the fixing heater 62 and the bonding heater 401 are supplied with power. Here, for the sake of clarity, the inlet current Iin is assumed to be the sum of the heater current Ih1 and the heater current Ih2. However, in practice, the inlet current Iin also includes the working current of the power supply apparatus 503.

Typically, a lower heater temperature means a lower heater resistance value. Thus, lower heater temperatures mean higher amounts of heater current. When the image forming apparatus 100 is activated after being stopped for a long amount of time in a low-temperature environment, in a time period from time t3 to time t5, the inlet current Iin may exceed the standard value Ipse (15 A).

The following method is a method for resolving this issue. When a user designates a print mode that uses the post-processing apparatus 130 which uses a lot of power, the printer control unit 506 reduces the amount of power supplied to the fixing heater 62 and delays the start of printing so that the inlet current Iin does not exceed the standard value Ipse. The start of printing is delayed because of the increased amount of time required for the temperature of the fixing heater 62 to reach the target temperature due to the power supply to the fixing heater 62 being reduced. In another method, the printer control unit 506 monitors the inlet current Iin and determines whether or not there is a possibility of the inlet current Iin exceeding the standard value Ipse. In a case where there is a possibility of the inlet current Iin exceeding the standard value Ipse, the printer control unit 506 reduces the power supply to the fixing heater 62 and temporarily suspends the print operation or reduce the print speed.

However, in a case where the bonding heater 401 is provided for booklet manufacturing as in the first embodiment, only reducing the power supply to the fixing heater 62 causes the print time to greatly increase.

Figure 6B:
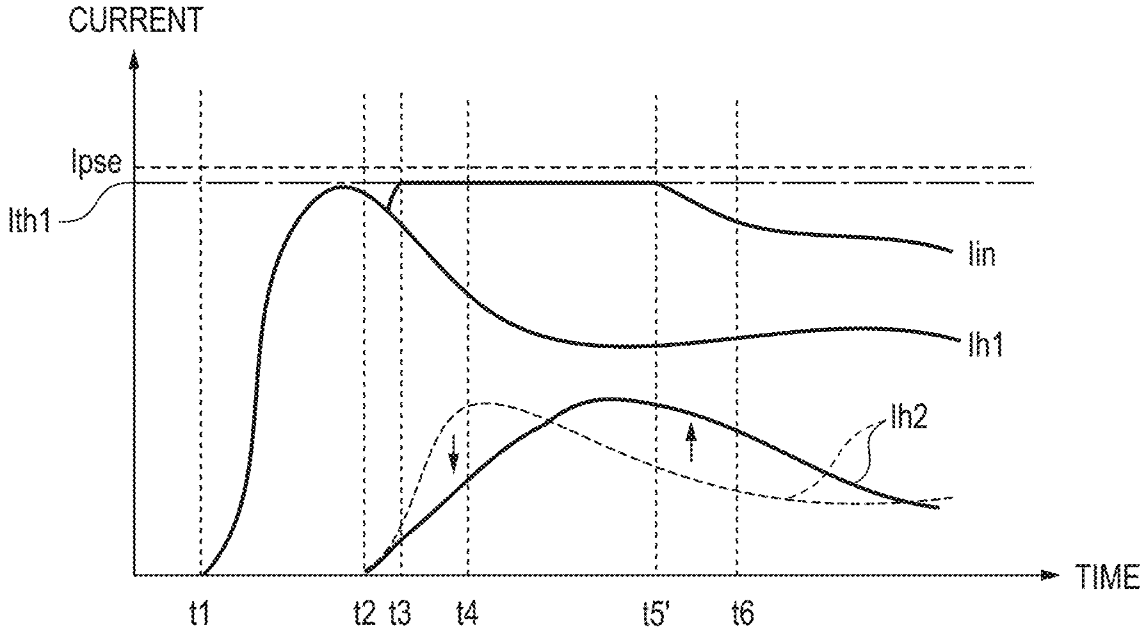

FIG. 6B illustrates the inlet current Iin and the heater currents Ih1 and Ih2 according to the first embodiment. The heater current Ih2 is indicated by a solid line and a dashed line, with the solid line indicating the heater current Ih2 of the first embodiment (power supply restriction mode). The dashed line indicates the heater current Ih2 of FIG. 6A (normal mode).

According to the first embodiment, the inlet current Iin is reduced so that it does not exceed the standard value Ipse and an increase in the print time is suppressed. As illustrated in FIG. 6B, the printer control unit 506 adjusts the power supplied at least to the bonding heater 401 on the basis of the inlet current Iin detected by the detection circuit 502.

Specifically, the printer control unit 506 monitors the inlet current Iin detected by the detection circuit 502 and determines whether or not the inlet current Iin will exceed a first threshold Ith1. In this example, at time t3, the inlet current Iin reaches the first threshold Ith1. Note that the first threshold Ith1 is lower than the standard value Ipse. For example, the first threshold Ith1 is determined by subtracting a predetermined margin from the standard value Ipse. The predetermined margin is determined by an experiment or a simulation. When the inlet current Iin is equal to or greater than the first threshold Ith1, the printer control unit 506 instructs the optional control unit 510 to restrict the power supply to the bonding heater 401. When the optional control unit 510 receives this instruction, the optional control unit 510 controls the drive circuit 511 to restrict the power supply to the bonding heater 401.

As the temperature of the fixing heater 62 approaches the target temperature, the power required by the fixing heater 62 decreases. Thus, the heater current Ih1 of the fixing heater 62 after time t2, is less than the heater current Ih1 from time t1 to time t2. For example, the printer control unit 506 may transmit a difference dI between the first threshold Ith1 and the heater current Ih1 to the optional control unit 510. The optional control unit 510 can increase the heater current Ih2 supplied to the bonding heater 401 by just an amount corresponding to the difference dI. Accordingly, the inlet current Iin does not exceed the first threshold Ith1 and the standard value Ipse, and the power supply to the bonding heater 401 is gradually increased in accordance with a decrease in the fixing heater 62 current. In other words, power can be supplied to the bonding heater 401 at a maximum within a range in which the inlet current Iin does not exceed the standard value Ipse.

At time t5' illustrated in FIG. 6B, the printer control unit 506 recognizes that the inlet current Iin has dropped below the first threshold Ith1 and determines that the possibility of the inlet current Iin exceeding the standard value Ipse is reduced. The printer control unit 506 instructs the optional control unit 510 to cancel the restriction on the power supply for the bonding heater 401. When the optional control unit 510 receives the instruction to cancel the power supply restriction, the optional control unit 510 controls the power supply to the bonding heater 401 to make the temperature of the bonding heater 401 reach the target temperature by time t6.

When the power supply to the bonding heater 401 is restricted, the amount of time required for the temperature of the bonding heater 401 to reach the target temperature is increased. This means that the print time is increased. As in the first embodiment, in a case where a plurality of heaters (the fixing heater 62 and the bonding heater 401) are disposed on the upstream side and the downstream side in the conveying path direction of the sheet S, from when the first sheet S passes through the upstream heater to when it reaches the downstream heater, a certain amount of time passes. Using this time, control of power supply to the bonding heater 401, the downstream heater, is implemented. As described in relation to FIG. 6B, in a case where the heater current Ih1 flowing when starting-up the fixing heater 62 is large, power supply to the bonding heater 401 is reduced. On the other hand, when the heater current Ih1 is small, power supply to the bonding heater 401 is increased in a range in which the inlet current Iin does not exceed the standard value Ipse. By performing such power supply control, the amount that the power supply to the bonding heater 401 is reduced is decreased. In this manner, the power supply during the start-up initial period (for example, from time t2 to time t5') of the bonding heater 401 is reduced, but power supply is added at the start-up intermediate period or later period (time t5' to time t6) of the bonding heater 401. The amount of power (kWh) supplied to the bonding heater 401 from time t2 to time t6 may not change. Thus, the print time may not increase, and the temperature of the bonding heater 401 can reach the target temperature by time t6.

According to the first embodiment, the image forming system 1 including the fixing heater 62 disposed on the upstream side in the conveying path and the bonding heater 401 disposed on the downstream side. According to the first embodiment, the consumption current overall in the image forming system 1 is suppressed from exceeding the standard value and an increase in the print time is suppressed.

Note that in the first embodiment, the power supply to the fixing heater 62 may also be reduced within a range so that the print time is not increased. The printer control unit 506 determines the first threshold Ith1 in accordance with the print mode (for example, the one-sided printing mode, the double-sided printing mode, the monochrome mode, and the color mode). The printer control unit 506 may determine the first threshold Ith1 in accordance with the temperature (and humidity) of the environment where the image forming apparatus 100 is installed. The printer control unit 506 may determine the first threshold Ith1 in accordance with the sheet S type (for example, plain paper, thick paper, thin paper, and coated paper). The printer control unit 506 may monitor the conveying position of the sheet S by measuring the elapsed time from start of the sheet S feeding using a timer. The printer control unit 506 may determine the first threshold Ith1 in accordance with the conveying position (elapsed time) of the sheet S.

The image forming apparatus 100 may be left in an extremely low-temperature environment for an extended period of time. As a result, even with the control described above, there is a possibility that the inlet current Iin exceeds the standard value Ipse. In this case, the printer control unit 506 may reduce the power supply to the fixing heater 62. Alternatively, the printer control unit 506 may temporarily suspend the print operation or reduce the print speed. Note that temporarily suspending the print operation or reducing the print speed may be performed in a case where the inlet current Iin exceeds the standard value Ipse and not only when restricting the power supply to the fixing heater 62.

In the first embodiment, the thermocompression bonding unit 51 is disposed with the post-processing apparatus 130.

However, the thermocompression bonding unit 51 may be disposed inside the image forming apparatus 100.

(7) Printer Control Unit Functions

Figure 7:
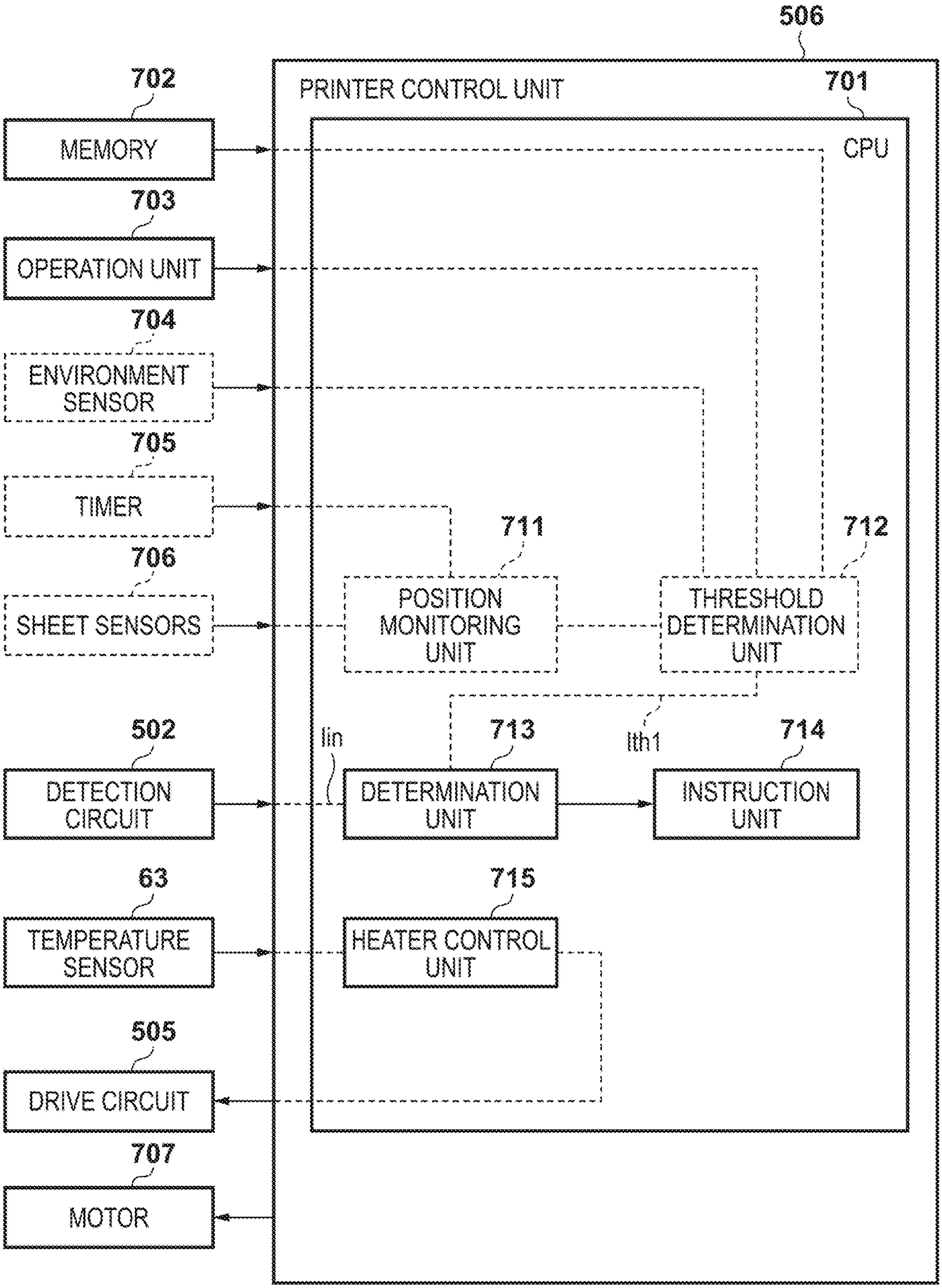
FIG. 7 is a diagram for explaining a printer control unit.

FIG. 7 illustrates the functions of the printer control unit 506. For example, the printer control unit 506 includes a CPU 701. A CPU 701 implements various functions by executing a control program stored in a memory 702. A position monitoring unit 711 monitors the conveying position of the sheet S on the basis of the elapsed time from the time when feeding of the sheet S started or the detection result of a plurality of sheet sensors 706 installed along the conveying path. A timer 705 measures the elapsed time from the time when feeding of the sheet S started. A threshold determination unit 712 may determine the first threshold Ith1 in accordance with the conveying position of the sheet S. A function or table for determining the first threshold Ith1 from the conveying position of the sheet S may be stored in the memory 702.

The threshold determination unit 712 may determine the first threshold Ith1 on the basis of an environmental parameter (for example, the environment temperature of the image forming apparatus 100) detected by an environment sensor 704. A function or table for determining the first threshold Ith1 from the environmental parameter may be stored in the memory 702.

The threshold determination unit 712 may determine the first threshold Ith1 on the basis of the type of the sheet S input from an operation unit 703. The first threshold Ith1 associated with each of the plurality of types may be stored in the memory 702.

Alternatively, the first threshold Ith1 may be a fixed value stored in a read-only memory (ROM) area of the memory 702. The threshold determination unit 712 reads out the first threshold Ith1 from the memory 702 and sets it in a determination unit 713.

The determination unit 713 determines whether or not the inlet current Iin detected by the detection circuit 502 is greater than the first threshold Ith1. When the inlet current Iin is greater than the first threshold Ith1, an instruction unit 714 transmits an instruction to restrict power supply to the bonding heater 401 to the optional control unit 510. When the inlet current Iin is equal to or less than the first threshold Ith1, an instruction unit 714 transmits an instruction to cancel the restriction of the power supply to the bonding heater 401 to the optional control unit 510.

A heater control unit 715 controls the drive circuit 505 to make the temperature of the fixing heater 62 detected by the temperature sensor 63 reach the target temperature. The CPU 701 further controls a motor 707 that drives the conveyance roller pair 82 and the like to convey the sheet S. Accordingly, the conveyance speed (print speed) of the sheet S is controlled.

(8) Flowchart

Figure 8:
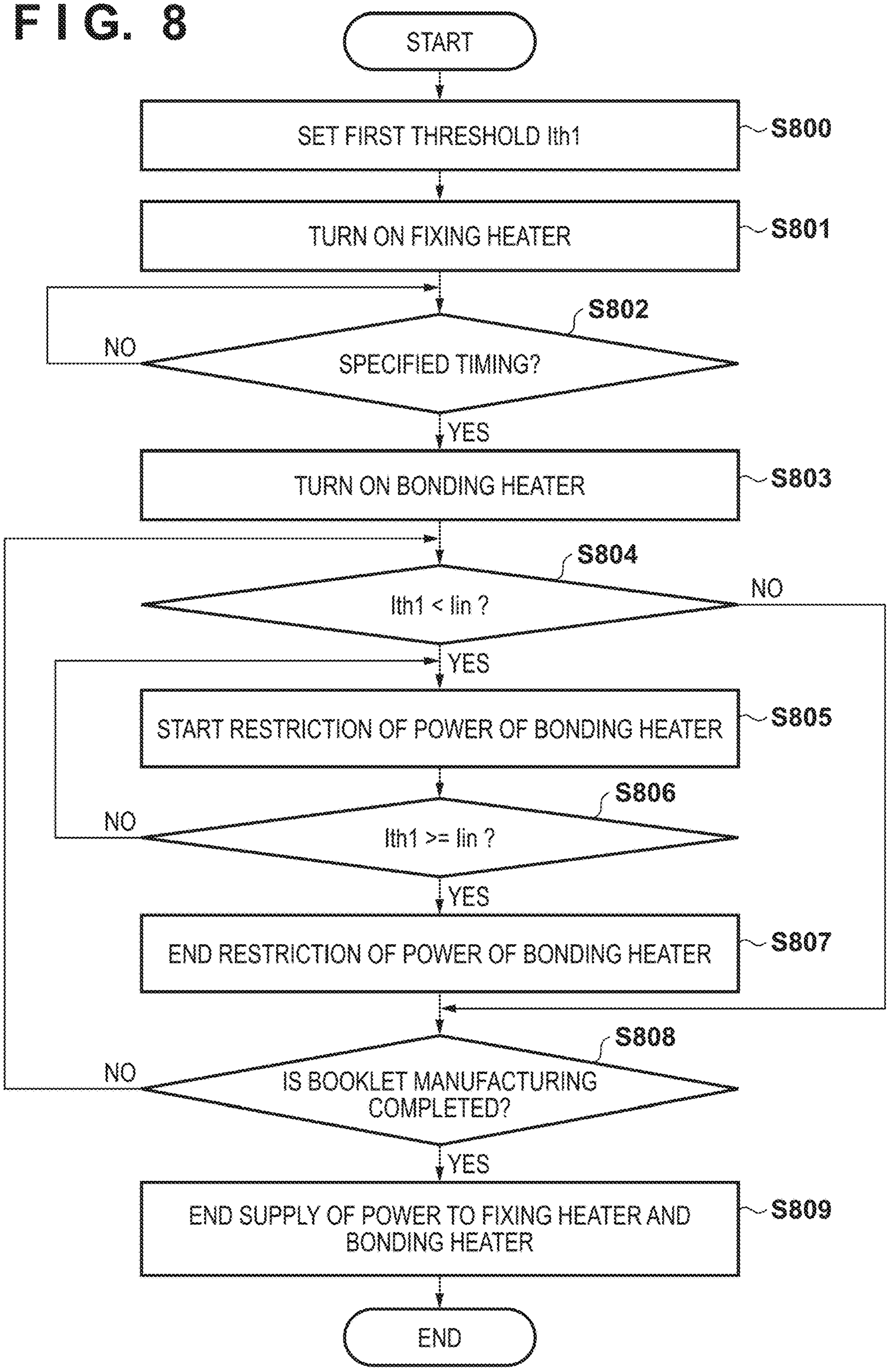
FIG. 8 is a flowchart for explaining heater power control.

FIG. 8 illustrates a power control method for the fixing heater 62 and the bonding heater 401 executed by the CPU 701. When a printing instruction is input via the operation unit 703, the CPU 701 executes the following processing.

In step S800, the CPU 701 (threshold determination unit 712) sets the first threshold Ith1 in the determination unit 713. The first threshold Ith1 may be read out from the memory 702 or may be dynamically determined on the basis of the first threshold Ith1.

In step S801, the CPU 701 (heater control unit 715) turns on the fixing heater 62. For example, the CPU 701 instructs the drive circuit 505 to turn on the fixing heater 62. The CPU 701 outputs a control signal to the drive circuit 505 to make the temperature of the fixing heater 62 detected by the temperature sensor 63 reach the target temperature and stay there.

In step S802, the CPU 701 determines whether or not a specified timing (for example, time t2) has arrived. For example, time t2 may be the time that a predetermined amount of time has elapsed since the time (for example, time t1) of the start of the print operation. When the specified timing (for example, time t2) arrives, the CPU 701 proceeds from step S802 to step S803.

In step S803, the CPU 701 turns on the bonding heater 401. For example, the CPU 701 (instruction unit 714) instructs the optional control unit 510 to turn on the bonding heater 401. In this manner, the optional control unit 510 starts supplying power to the bonding heater 401.

In step S804, the CPU 701 (determination unit 713) determines whether or not the inlet current Iin is greater than the first threshold Ith1. If the inlet current Iin is not greater than the first threshold Ith1, the CPU 701 proceeds from step S804 to step S808. If the inlet current Iin is greater than the first threshold Ith1, the CPU 701 proceeds from step S804 to step S805.

In step S805, the CPU 701 (instruction unit 714) starts restricting power supply to the bonding heater 401. The instruction unit 714 transmits a power supply restriction instruction to the optional control unit 510. In this manner, the optional control unit 510 restricts the amount of power supplied to the bonding heater 401.

In step S806, the CPU 701 (determination unit 713) determines whether or not the inlet current Iin is equal to or less than the first threshold Ith1. If the inlet current Iin is not equal to or less than the first threshold Ith1, the CPU 701 continues the power supply restriction state for the bonding heater 401. If the inlet current Iin is equal to or less than the first threshold Ith1, the CPU 701 proceeds from step S806 to step S807.

In step S807, the CPU 701 ends the power supply restriction on the bonding heater 401. For example, the instruction unit 714 transmits a cancel instruction to the optional control unit 510. In this manner, the optional control unit 510 cancels the restriction of the power supply to the bonding heater 401.

In step S808, the CPU 701 determines whether or not the booklet manufacturing is complete. Whether or not the booklet manufacturing is complete may be determined by whether or not a booklet has been discharged to the lower tray 37. If the booklet manufacturing is not complete, the CPU 701 returns to step S804 from step S808. If the booklet manufacturing is complete, the CPU 701 proceeds from step S808 to step S809.

In step S809, the CPU 701 ends the power supply to the fixing heater 62 and the bonding heater 401. The heater control unit 715 ends the power supply to the fixing heater 62. The instruction unit 714 instructs the optional control unit 510 to end the power supply to the bonding heater 401. In this manner, the optional control unit 510 ends the power supply to the bonding heater 401.

Second Embodiment (1) Basic Concept

According to the first embodiment, power supply to the bonding heater 401 is reduced when the current at the start-up of the fixing heater 62 is large, and the power supply to the bonding heater 401 is increased when the current at the start-up of the fixing heater 62 decreases. Also, time t2 in FIG. 6A is the same as time t2 in FIG. 6B. In other words, the timing (start timing) of the start of power supply to the bonding heater 401 has not been adjusted. Regarding this, the printer control unit 506 may delay the start time for the bonding heater 401 on the basis of the detection result of the inlet current Iin.

Figure 9:
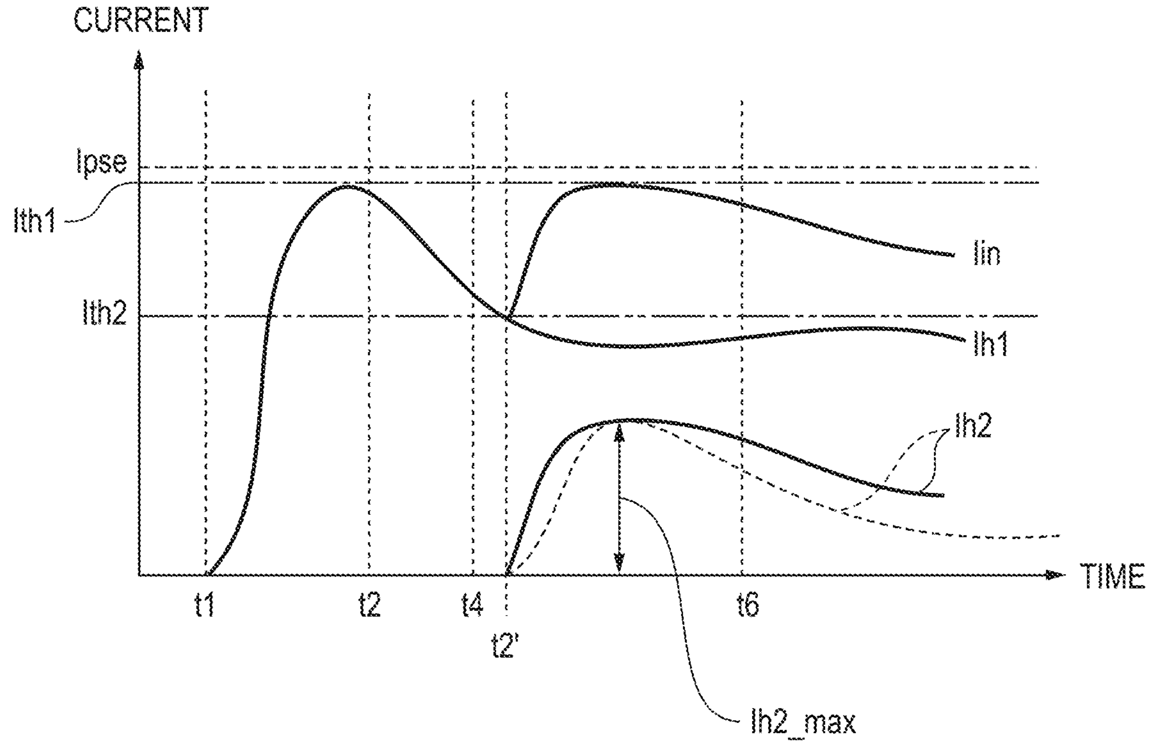
FIG. 9 is a diagram for explaining changes in the inlet current and the heater current.

FIG. 9 is a diagram for explaining heater power control according to the second embodiment. In FIG. 9, items in common with those in FIGS. 6A and 6B are given the same reference sign. In FIG. 9, the control from time t1 to time t2 is similar to the control from time t1 to time t2 in FIG. 6B.

At time t2, the CPU 701 determines whether or not to start the power supply to the bonding heater 401 on the basis of the inlet current Iin detected by the detection circuit 502. For example, the CPU 701 determines whether or not the inlet current Iin is greater than a preset second threshold Ith2. In a case where the inlet current Iin is greater than the second threshold Ith2, there is a possibility of the inlet current Iin exceeding the standard value Ispe (15 A) if power supply to the bonding heater 401 is started. In this case, the CPU 701 delays the timing of the power supply to the bonding heater 401 from time t2 to time t2'. Here, the second threshold Ith2 is less than the first threshold Ith1. For example, the second threshold Ith2 may be determined by subtracting an expected maximum current Ih2_max of the bonding heater 401 from the standard value Ipse or the first threshold Ith1. In a case where the second threshold Ith2 is determined by subtracting the expected maximum current Ih2_max from the first threshold Ith1, the difference between the standard value Ipse and the second threshold Ith2 is greater than the expected maximum current Ih2_max. As a result, the probability of the inlet current Iin exceeding the standard value Ipse is also reduced.

At time t2', the heater current Ih1 flowing through the fixing heater 62 is reduced, and the inlet current Iin becomes less than the second threshold Ith2. Here, the CPU 701 instructs the optional control unit 510 to start power supply to the bonding heater 401. The optional control unit 510 starts supplying power to the bonding heater 401 on the basis of this instruction. The optional control unit 510 controls the power supply to the bonding heater 401 to make the temperature of the bonding heater 401 reach the target temperature by time t6.

As in the first embodiment, the start timing of the power supply to the bonding heater 401 is delayed using the conveying time from when the first sheet S passes through the fixing heater 62 to when it arrives at the bonding heater 401. Note that the time from time t2' to time t6 is shorter than the time from time t2, the specified timing, to time t6. Thus, the power (heater current Ih2 indicated by a solid line) supplied to the bonding heater 401 is increased more than the normal power (heater current Ih2 indicated by a dashed line). In this manner, the temperature of the bonding heater 401 can be made to reach the target temperature without increasing the print time.

(2) CPU 701 Functions

Figure 10:
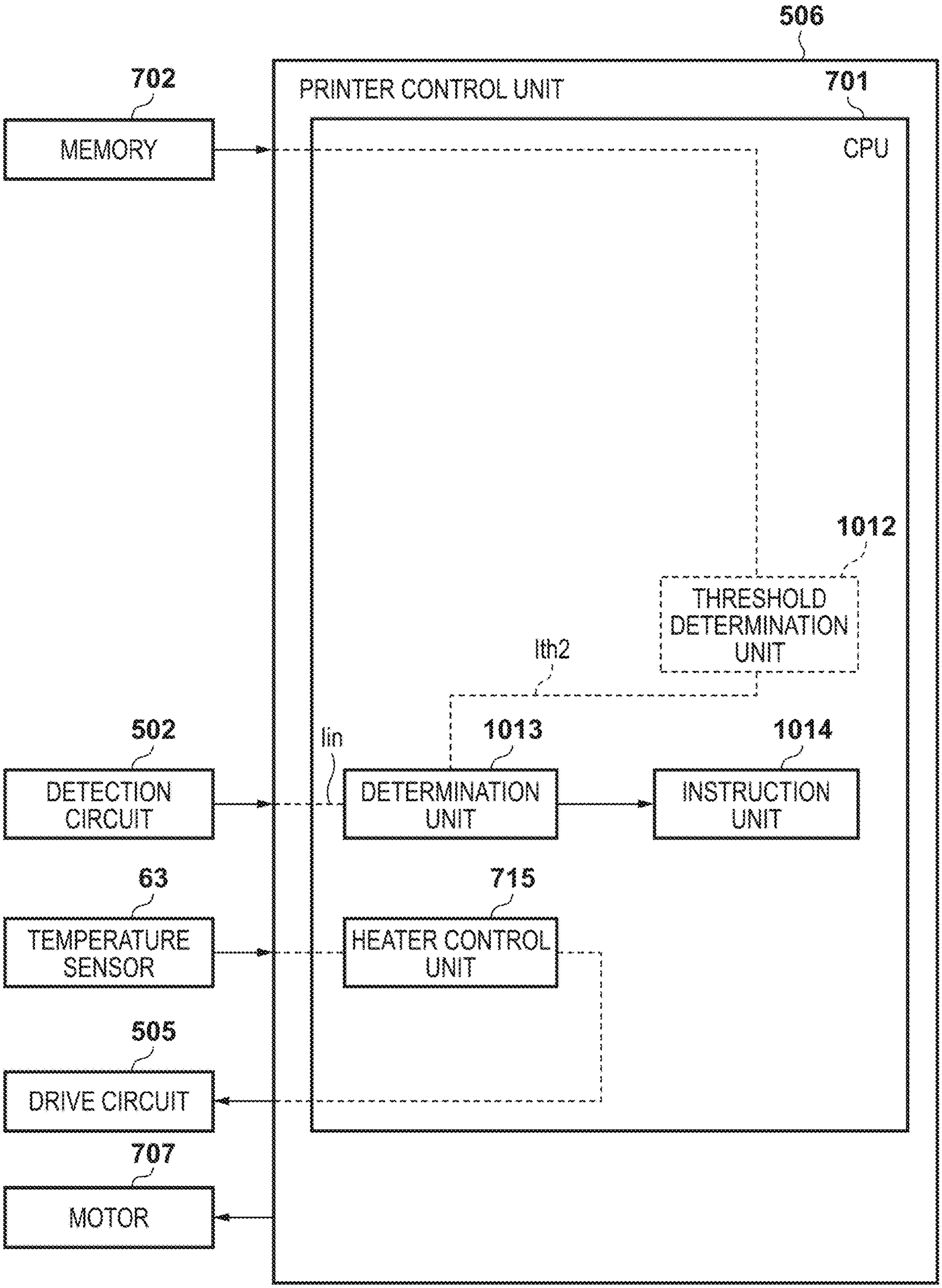
FIG. 10 is a diagram for explaining the printer control unit.

FIG. 10 illustrates the functions implemented by the CPU 701 of the second embodiment. A threshold determination unit 1012 determines the second threshold Ith2 on the basis of the standard value Ipse and the expected maximum current Ih2_max stored in the memory 702. Note that in a case where the second threshold Ith2 is already stored in the memory 702, the threshold determination unit 1012 reads out the second threshold Ith2 from the memory 702 and sets it in a determination unit 1013. Note that in a case where the optional control unit 510 includes a detection circuit (detection circuit 1202 of FIG. 12) that detects the heater current Ih2, the optional control unit 510 reports the heater current Ih2 to the printer control unit 506. When the heater current Ih2 exceeds the existing expected maximum current Ih2_max, the CPU 701 may update the expected maximum current Ih2_max stored in the memory 702 using the heater current Ih2.

At time t2, the determination unit 1013 determines whether or not the inlet current Iin is greater than the second threshold Ith2. In a case where the inlet current Iin is greater than the second threshold Ith2 at time t2, an instruction unit 1014 delays the transmission of a signal to turn on the bonding heater 401 to the optional control unit 510. For example, the instruction unit 1014 delays the transmission of an instruction to turn on the bonding heater 401 to the optional control unit 510 until the inlet current Iin is less than the second threshold Ith2 at a time after time t2. When the inlet current Iin is less than the second threshold Ith2 (time t2'), the instruction unit 1014 instructs the optional control unit 510 to turn on the bonding heater 401. At this time, the instruction unit 1014 may instruct the optional control unit 510 to increase the power supply to the bonding heater 401 more than normal.

(3) Flowchart

Figure 11:
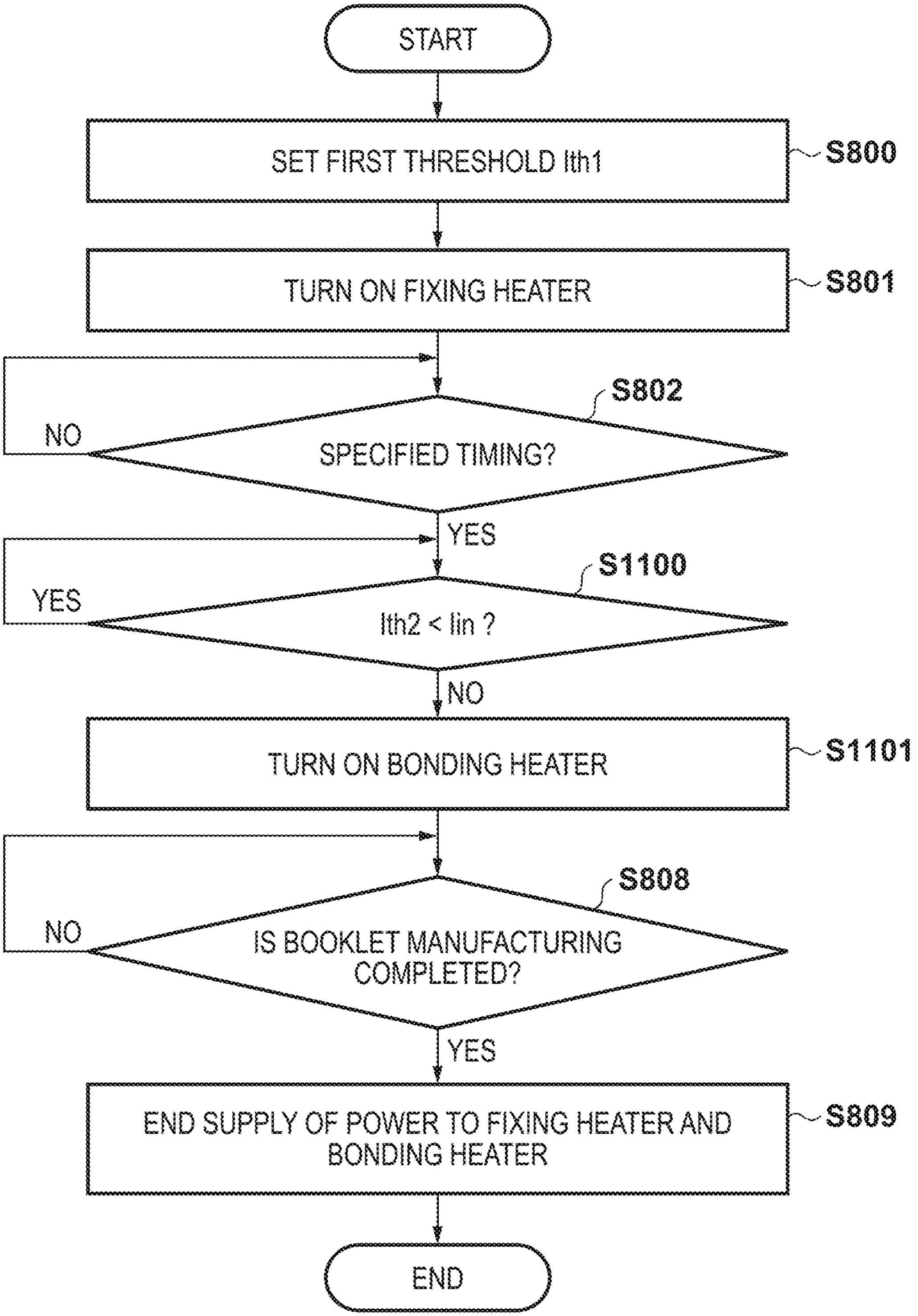
FIG. 11 is a flowchart for explaining heater power control.

FIG. 11 is a flowchart according to the second embodiment. The CPU 701 executes the following processing in accordance with a control program. Note that in FIG. 11, steps S1100 and S1101 are substituted in for steps S803 to S807 of FIG. 8. Thus, steps S1100 and S1101 will be the focus of the following description. When the specified timing is determined to have arrived in step S802, the CPU 701 proceeds from step S802 to S1100.

In step S1100, the CPU 701 (determination unit 1013) determines whether or not the inlet current Iin is greater than the second threshold Ith2. In a case where the inlet current Iin is greater than the second threshold Ith2, the CPU 701 delays the timing of the start of power supply to the bonding heater 401. In other words, the CPU 701 waits until the inlet current Iin is equal to or less than the second threshold Ith2. When the inlet current Iin is equal to or less than the second threshold Ith2, the CPU 701 proceeds from step S1100 to step S1101. Note that in a case where the inlet current Iin is greater than the second threshold Ith2 at time t2, the CPU 701 may set a flag to 1.

In step S1101, the CPU 701 (instruction unit 1014) instructs the optional control unit 510 to turn on the bonding heater 401. Note that if the flag is 1, the instruction unit 1014 may instruct the optional control unit 510 to increase the power supply to the bonding heater 401. Thereafter, the CPU 701 proceeds from step S1101 to step S808.

According to the second embodiment, by delaying the timing of the start of power supply to the bonding heater 401, the consumption current overall in the printer system can be suppressed from exceeding the standard value and an increase in the print time can be suppressed.

Note that the inlet current Iin may not become equal to or less than the second threshold Ith2 even when a predetermined amount of time has elapsed since time t2. In this case, the CPU 701 may reduce the power supply to the fixing heater 62. Also, the CPU 701 may temporarily suspend the print operation or reduce the print speed. Here, the predetermined amount of time is an amount of time determined so that the print speed (throughput) of the image forming apparatus 100 can reach a target speed. The throughput is the number of the sheets S that can be printed per unit time, for example.

The CPU 701 may determine a time difference (delay time) between time t2 and time t2' from the difference between the inlet current Iin and the second threshold Ith2 at time t2. In this case, when time t2' is reached, the CPU 701 may omit checking the inlet current Iin and may instruct the optional control unit 510 to supply power to the bonding heater 401. A larger difference between the inlet current Iin and the second threshold Ith2 means a longer delay time. A smaller difference between the inlet current Iin and the second threshold Ith2 means a shorter delay time.

Third Embodiment (1) Basic Concept

The main parts of the third embodiment are similar to that of the first embodiment. Thus, the items that the third embodiment has in common with the first embodiment are given the same reference sign and description thereof is omitted.

Figure 12:
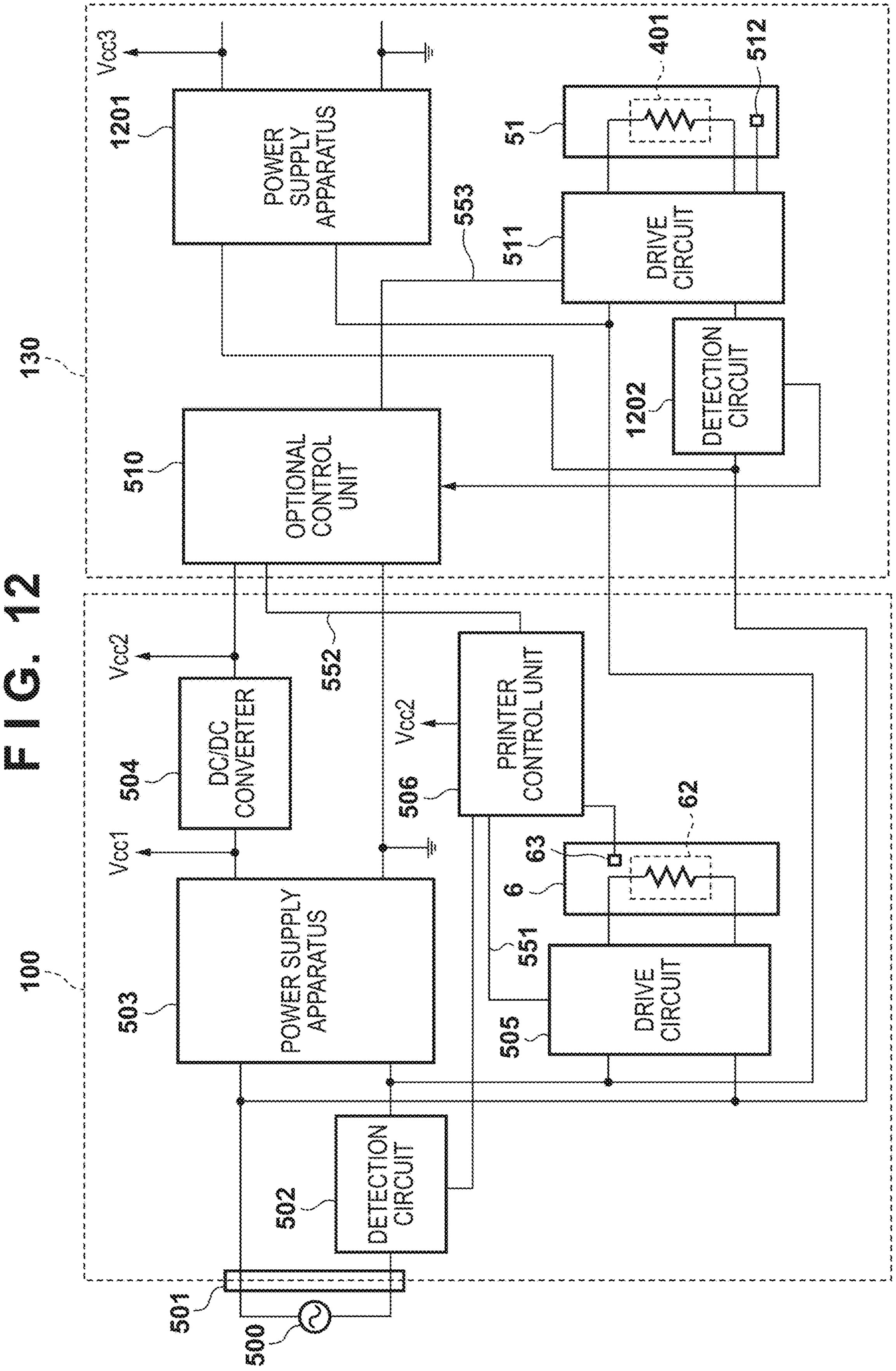
FIG. 12 is a diagram for explaining a control system.

FIG. 12 illustrates a circuit configuration of the image forming apparatus 100 and the post-processing apparatus 130 according to the third embodiment. The post-processing apparatus 130 includes a power supply apparatus 1201 and the detection circuit 1202. The detection circuit 1202 detects the heater current Ih2 flowing to the bonding heater 401.

The AC voltage input to the post-processing apparatus 130 is applied to the power supply apparatus 1201 via a different path than the path to the drive circuit 511 and the detection circuit 1202. The power supply apparatus 1201 is an AC/DC converter that converts the input AC voltage into a DC voltage Vcc3. In the first embodiment, the operating voltage of the motor and the like provided in the post-processing apparatus 130 corresponds to the DC voltage Vcc1 generated by the power supply apparatus 503. In the third embodiment, the DC voltage Vcc3 generated by the power supply apparatus 1201 is supplied to the motor and the like provided in the post-processing apparatus 130. Accordingly, power output capacity of the power supply apparatus 503 disposed in the image forming apparatus 100 can be reduced. As a result, the manufacturing cost of the power supply apparatus 503 is reduced. In a case where the cost of the power supply apparatus 503 of the first embodiment is higher than the cost of the power supply apparatus 503 and the power supply apparatus 1201 of the third embodiment, the third embodiment is more effective.

The detection circuit 1202 sends the detection result of the heater current Ih2 flowing through the bonding heater 401 to the optional control unit 510. The optional control unit 510 transmits the detection result of the heater current Ih2 to the printer control unit 506 via the communication line 552.

In FIG. 6B, the power supply of the bonding heater 401 is reduced on the basis of the inlet current Iin information, but the ratio of the heater current Ih2 to the inlet current Iin is unclear. As described in the first embodiment, the inlet current Iin also includes the working current of the power supply apparatus 503. Thus, in a case such as the third embodiment where the post-processing apparatus 130 is provided with the power supply apparatus 1201, the total value of the working current of the power supply apparatus 503, the power supply apparatus 1201, the fixing heater 62, and the bonding heater 401 corresponds to the inlet current Iin. If the ratio F of the heater current Ih2 with respect to the inlet current Iin is small, the inlet current Iin may be unable to be suppressed to equal to or less than the standard value Ipse by simply reducing the power supply to the bonding heater 401. In this case, the printer control unit 506 needs to reduce the power supply to the fixing heater 62 and temporarily suspend the print operation or reduce the print speed.

However, there are constraints on the timing of when the conveyance of the sheet S can be stopped and when the conveyance speed can be reduced. If the power supply to the fixing heater 62 is reduced, the amount of time for the temperature of the fixing heater 62 to reach the target temperature is increased. Thus, the conveyance control must be changed at a time before the sheet S reaches the fixing device 6. Also, if the conveyance control is changed while the toner image is being transferred from the transfer belt 30 to the sheet S, the quality of the image formed on the sheet S may be decreased. Accordingly, it is best to avoid a change to the conveyance control at such timing. Thus, the determination of whether or not to change the conveyance control should be determined at a time as early as possible after the print operation has started. In this manner, a sufficiently large time period in which conveyance control of the sheet S can be changed is ensured.

In the third embodiment, the printer control unit 506 determines whether or not to change the conveyance control on the basis of the inlet current Iin and the heater current Ih2 of the bonding heater 401 detected by the detection circuit 1202. The printer control unit 506 obtains the ratio F of the heater current Ih2 with respect to the inlet current Iin and determines whether or not the ratio F is less than a threshold Fth. In a case where the ratio F is less than the threshold Fth, the inlet current Iin will exceed the standard value Ipse even if the power supply to the bonding heater 401 is reduced. Thus, the printer control unit 506 reduces the power supply to the fixing heater 62 and temporarily suspends the print operation or reduces the print speed.

Accordingly, the determination of whether or not to change the conveyance control can be performed at an earlier timing. The required time period for changing the conveyance control of the sheet S is sufficiently ensured, and the quality of the image formed on the sheet S is also maintained. Furthermore, the inlet current Iin is suppressed to less than the standard value Ipse.

In the second embodiment described above, the second threshold Ith2 is determined by subtracting the expected maximum current Ih2_max from the standard value Ipse. The heater current Ih2 changes depending on the temperature of the bonding heater 401. Thus, in a case where the actual heater current Ih2 is less than the expected maximum current Ih2_max, there is a possibility of the timing of the power supply to the bonding heater 401 being unnecessarily delayed.

Here, the detection circuit 1202 may also be added to the second embodiment. The CPU 701 may adjust the curve of the power supplied from time t2' to time t6 on the basis of the actual heater current Ih2. This helps stop the amount of time required for the temperature of the bonding heater 401 to reach the target temperature from being unnecessarily extended.

According to the third embodiment, the CPU 701 can accurately determine whether or not there is a possibility of the inlet current Iin exceeding the standard value Ipse by taking into account both the inlet current Iin and the heater current Ih2 of the bonding heater 401. As a result, the CPU 701 can determine whether or not an increase in the print time is necessary more accurately and at an early timing. Thus, the inlet current Iin can be reduced to equal to or less than the standard value Ipse while maintaining image quality. Also, an increase in the print time can be suppressed.

(2) CPU Functions

Figure 13:
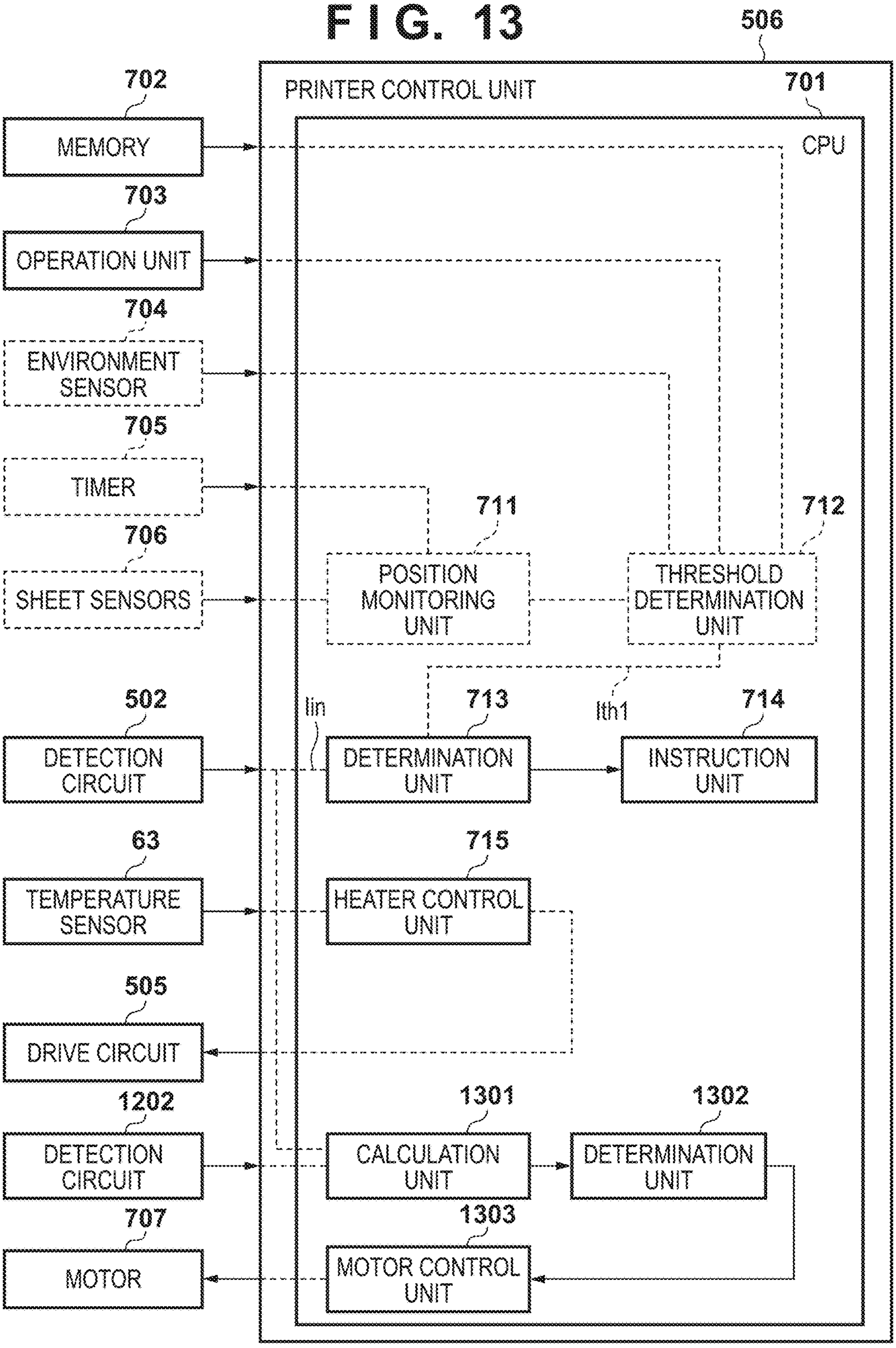
FIG. 13 is a diagram for explaining the printer control unit.

FIG. 13 illustrates the functions implemented by the CPU 701 according to the third embodiment. Note that items described in the first embodiment will be omitted from the description.

A calculation unit 1301 calculates the ratio F of the heater current Ih2 detected by the detection circuit 1202 with respect to the inlet current Iin detected by the detection circuit 502. A determination unit 1302 determines whether or not the ratio F is less than the threshold Fth. The threshold Fth is determined in advance via an experiment or simulation and is stored in the ROM area of the memory 702. In a case where the ratio F is less than the threshold Fth, there is a possibility of the inlet current Iin exceeding the standard value Ipse even if the heater current Ih2 flowing to the bonding heater 401 is adjusted. Here, a motor control unit 1303 controls the motor 707 to keep the print operation suspended and controls the motor 707 to reduce the print speed.

(3) Flowchart

Figure 14:
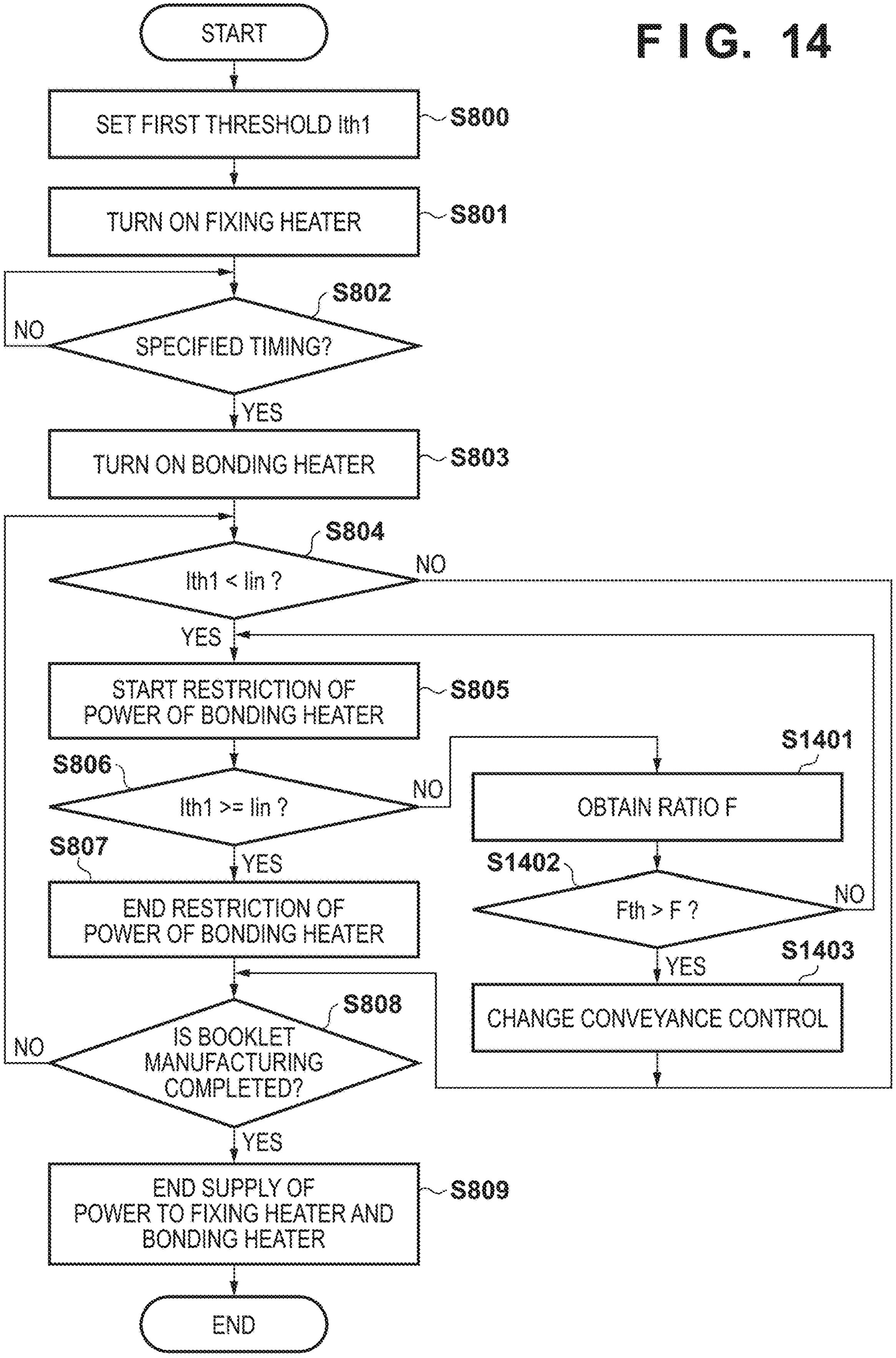
FIG. 14 is a flowchart for explaining heater power control.

FIG. 14 illustrates the power supply control performed by the CPU 701 according to the third embodiment. The difference between FIG. 14 and FIG. 8 is that the CPU 701 proceeds from step S806 to step S1401 in the case of no in step S806.

In step S1401, the CPU 701 (calculation unit 1301) calculates the ratio F of the heater current Ih2 with respect to the inlet current Iin. In step S1402, the CPU 701 (determination unit 1302) determines whether or not the ratio F is less than the threshold Fth. If the ratio F is equal to or greater than the threshold Fth, the CPU 701 returns to step S805 from step S1402 and the power supply restriction on the bonding heater 401 is continued. However, if the ratio F is less than the threshold Fth, the effect of the power supply restriction on the bonding heater 401 on the inlet current Iin is small. Thus, the CPU 701 proceeds from step S1402 to step S1403.

In step S1403, the CPU 701 (motor control unit 1303) changes the conveyance control of the sheet S. For example, the motor control unit 1303 controls the motor 707 to keep the print operation suspended and controls the motor 707 to reduce the print speed. Accordingly, the inlet current Iin is suppressed from exceeding the standard value Ipse. Note that the CPU 701 may change the conveyance control and reduce the power (heater current Ih1) supplied to the fixing heater 62. For example, in a case where the inlet current Iin will exceed the first threshold Ith1 even if the heater current Ih1 is reduced, the CPU 701 may change the conveyance control.

Technical Ideas Derived from Embodiments (Item 1)

The post-processing apparatus 130 and the thermocompression bonding unit 51 function as a booklet manufacturing unit that manufactures a booklet by heating a plurality of sheets that have passed through the fixing device 6 using a second heater (for example, the bonding heater 401) and bonding together the plurality of sheets. The printer control unit 506 controls the power supplied from the inlet to the first heater and the second heater. The printer control unit 506 adjusts power supplied to the second heater so that the inlet current does not exceed a rated value (for example, the standard value Ipse) on a basis of the inlet current detected by the first detection circuit.

According to the first to third embodiments, at least the heater current Ih2 is controlled so that the inlet current Iin does not exceed the standard value Ipse. This makes it difficult for the consumption current in the image forming apparatus 100 that manufactures booklets by heating the plurality of sheets S using a heat and bonding them together to exceed the rated value (standard value Ipse).

(Item 2)

As described in the first and third embodiments, in a case where the inlet current Iin is greater than the first threshold Ith1, at least the heater current Ih2 may be temporarily reduced. Accordingly, the inlet current Iin may be kept below the standard value Ipse.

(Item 3)

As described in the first to third embodiments, the timing of power supply to the bonding heater 401 may be adjusted. Accordingly, the inlet current Iin may be kept below the standard value Ipse. Note that as illustrated in FIG. 6B, reducing the power in a first time period and increasing the power in a second time period corresponds to adjusting the power supply timing.

(Item 4)

As illustrated in FIG. 9, the CPU 701 may delay the timing of power supply to the bonding heater 401. Accordingly, the inlet current Iin may be kept below the standard value Ipse.

(Item 5)

As described in the first and third embodiment, by adjusting both the heater current Ih1 and the heater current Ih2, the inlet current Iin may be kept (Item 6)

As described in the second and third embodiment, the CPU 701 may adjust the power supplied to the bonding heater 401 taking into account both the inlet current Iin and the heater current Ih2. For example, the ratio F of the heater current Ih2 with respect to the inlet current Iin may be taken into account. Also, the second threshold Ith2 may be determined on the basis of the maximum value (for example, Ih2_max) of the heater current Ih2 previously measured, and the bonding heater 401 may be controlled on the basis of the second threshold Ith2. Accordingly, the inlet current Iin may be kept below the standard value Ipse.

(Item 7)

As described in the second and third embodiment, the CPU 701 may delay the timing of power supply to the bonding heater 401. In this manner, restricting power supply may include both a power-amount-based restriction and a time-based restriction. Accordingly, the inlet current Iin may be kept below the standard value Ipse.

(Item 8)

As described in the third embodiment, the CPU 701 may reduce both the power of the fixing heater 62 and the power of the bonding heater 401. Accordingly, the inlet current Iin may be kept below the standard value Ipse.

(Item 9)

As described in the third embodiment, the CPU 701 may reduce the print speed if the ratio F is too low. Accordingly, the inlet current Iin may be kept (Item 10)

As illustrated in FIG. 9, when the inlet current Iin is greater than the second threshold Ith2, the CPU 701 waits until the inlet current Iin becomes equal to or less than the second threshold Ith2.

(Item 11)

In the second embodiment, an example in which the difference between the standard value Ipse and the second threshold Ith2 is the expected maximum current Ih2_max is introduced. However, this difference may be set to a value greater than the expected maximum current Ih2_max taking into account a margin. For example, the difference between the first threshold Ith1 and the second threshold Ith2 may be the expected maximum current Ih2_max.

(Item 12)

As described in the second embodiment, the CPU 701 may obtain the heater current Ih2 from the detection circuit 1202 described in the third embodiment. In a case where the heater current Ih2 is greater than the expected maximum current Ih2_max stored in the memory 702, the CPU 701 updates the expected maximum current Ih2_max with the heater current Ih2. Also, the CPU 701 may update the second threshold Ith2 on the basis of the standard value Ipse and the updated expected maximum current Ih2_max. Accordingly, even when the image forming apparatus 100 is left in a low-temperature environment, the inlet current Iin is kept below the standard value Ipse.

(Item 13)

As described in the first embodiment, the first threshold may be determined in accordance with the print mode, the environment temperature, or the type of the sheet S. Accordingly, the first threshold Ith1 may be set to an appropriate value in accordance with the print mode, the environment temperature, or the type of the sheet S.

(Item 14)

As described in the first embodiment, the first threshold Ith1 may be determined in accordance with the elapsed time from when the print operation started.

(Item 15)

As described in the first embodiment, the first threshold Ith1 may be determined in accordance with the conveying position of the sheet S.

(Item 16)

As described in the first and third embodiment, in a case where the inlet current Iin will exceed the standard value Ipse even if power to the bonding heater 401 is reduced, the power of the fixing heater 62 may be reduced. Accordingly, the inlet current Iin may be reliably kept below the standard value Ipse.

(Item 17)

As described in the first to third embodiment, the CPU 701 first applies a power supply restriction on the bonding heater 401. If this is insufficient, the CPU 701 applies a power supply restriction on the fixing heater 62 also. If this is insufficient, the CPU 701 may reduce the conveyance speed of the sheet S by controlling the motor 707. Accordingly, the inlet current Iin may be reliably kept (Item 18)

The CPU 701 may control the motor 707 and set the conveyance speed of the sheet S to zero in order to temporarily suspend image formation on the sheet S. Accordingly, the inlet current Iin is reliably kept below the standard value Ipse.

(Item 19)

As illustrated in FIG. 6B, the heater current Ih2 indicated by the dashed line corresponds to when the CPU 701 executes the first supply mode. The heater current Ih2 indicated by the solid line corresponds to when the CPU 701 executes the second supply mode. If the inlet current Iin is not greater than the first threshold Ith1, the CPU 701 controls the bonding heater 401 in the first supply mode. If the inlet current Iin is greater than the first threshold, the CPU 701 controls the bonding heater 401 in the second supply mode. Accordingly, the inlet current Iin is kept below the standard value Ipse.

(Item 20)

The printer control unit 506 and the drive circuit 505 are an example of a first control unit that controls power supplied to the first heater. The optional control unit 510 and the drive circuit 511 are an example of a second control unit that controls power supplied to the second heater.

The plurality of heaters may be controlled via cooperation of the plurality of control units.

(Item 21)

As described in the first to third embodiment, the power supply restriction on the bonding heater 401 is implemented by at least one of an amount-based restriction on the heater current Ih2 and a time-based restriction on the heater current Ih2. This may be implemented by reducing the gradient of the heater current Ih2.

(Item 22)

The sheet cassette 8 may include a loading plate for loading the plurality of sheets. The pressing portion 409 may include a pressing plate that presses together the plurality of sheets.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-106202, filed Jun. 28, 2023 which is hereby incorporated by reference herein in its entirety.

What is claimed is:

1. An image forming apparatus comprising:

an image forming unit that forms an image on a sheet using toner;

a fixing unit including a first heater that fixes the image to the sheet;

a booklet manufacturing unit that manufactures a booklet by heating a plurality of sheets that have passed through the fixing unit using a second heater and bonding together the plurality of sheets;

an inlet through which power is supplied to the first heater and the second heater;

a first detection circuit that detects an inlet current flowing through the inlet; and a control circuit that controls the power supplied from the inlet to the first heater and the second heater, wherein the control circuit adjusts:

the power supplied to the second heater so that the inlet current does not exceed a rated value on a basis of the inlet current detected by the first detection circuit; and timing of power supply to the second heater so that the inlet current does not exceed the rated value in a case where the inlet current is greater than a first threshold less than the rated value, and wherein the adjusting timing of power supply to the second heater includes delaying the timing of power supply to the second heater.

2. The image forming apparatus according to claim 1, wherein the control circuit reduces the power supplied to the second heater so that the inlet current does not exceed the rated value in the case where the inlet current is greater than the first threshold.

3. An image forming apparatus comprising:

an image forming unit that forms an image on a sheet using toner;

a fixing unit including a first heater that fixes the image to the sheet;

a booklet manufacturing unit that manufactures a booklet by heating a plurality of sheets that have passed through the fixing unit using a second heater and bonding together the plurality of sheets;

an inlet through which power is supplied to the first heater and the second heater;

a first detection circuit that detects an inlet current flowing through the inlet; and a control circuit that controls the power supplied from the inlet to the first heater and the second heater, wherein the control circuit adjusts:

the power supplied to the second heater so that the inlet current does not exceed a rated value on a basis of the inlet current detected by the first detection circuit; and the power supplied to the first heater and the power supplied to the second heater so that the inlet current does not exceed the rated value in a case where the inlet current is greater than a first threshold less than the rated value.

4. An image forming apparatus comprising:

an image forming unit that forms an image on a sheet using toner;

a fixing unit including a first heater that fixes the image to the sheet;

a booklet manufacturing unit that manufactures a booklet by heating a plurality of sheets that have passed through the fixing unit using a second heater and bonding together the plurality of sheets;

an inlet through which power is supplied to the first heater and the second heater;

a first detection circuit that detects an inlet current flowing through the inlet; and a control circuit that controls the power supplied from the inlet to the first heater and the second heater; and a second detection circuit that detects a heater current flowing through the second heater, wherein the control circuit adjusts:

the power supplied to the second heater so that the inlet current does not exceed a rated value on a basis of the inlet current detected by the first detection circuit; and at least power supplied to the second heater so that the inlet current does not exceed the rated value on a basis of the inlet current and the heater current detected by the second detection circuit.

5. The image forming apparatus according to claim 4, wherein the control circuit delays at least the timing of power supply to the second heater so that the inlet current does not exceed the rated value on the basis of the inlet current and the heater current detected by the second detection circuit.

6. The image forming apparatus according to claim 4, wherein the control circuit reduces both the power supply to the first heater and the power supply to the second heater in a case where a ratio of the heater current detected by the second detection circuit with respect to the inlet current is less than a predetermined value.

7. The image forming apparatus according to claim 6, further comprising:

a conveyance roller that conveys the sheet to the image forming unit, wherein the control circuit further reduces a conveyance speed of the sheet in the case where the ratio is less than the predetermined value.

8. The image forming apparatus according to claim 2, further comprising:

a first memory that stores a second threshold less than the rated value, wherein the control circuit starts the power supply to the second heater in a case where the inlet current is reduced to equal to or less than the second threshold after the inlet current has exceeded the second threshold.

9. The image forming apparatus according to claim 8, wherein a difference between the rated value and the second threshold is equal to a maximum current flowing through the second heater or greater than the maximum current.

10. The image forming apparatus according to claim 9, further comprising:

a second detection circuit that detects a current flowing through the second heater; and a second memory that stores the maximum current flowing through the second heater detected by the second detection circuit, wherein the control circuit updates the second threshold on a basis of the maximum current stored in the second memory and the rated value.

11. The image forming apparatus according to claim 2, wherein the control circuit determines the first threshold in accordance with a print mode applied to the image forming unit, a temperature of an environment where the image forming apparatus is installed, or a type of the sheet.

12. The image forming apparatus according to claim 2, further comprising:

a time-measuring circuit that measures an elapsed time from a time when a print operation was started in the image forming apparatus, wherein the control circuit determines the first threshold in accordance with the elapsed time.

13. The image forming apparatus according to claim 2, further comprising:

a feeding roller that feeds the sheet to a conveying path; and a sensor that monitors a conveying position of the sheet feed to the conveying path by the feeding roller and conveyed along the conveying path, wherein the control circuit determines the first threshold in accordance with the conveying position of the sheet.

14. The image forming apparatus according to claim 3, wherein the control circuit reduces the amount of power supplied to the first heater in a case where the inlet current will exceed the rated value even if an amount of power supplied to the second heater or a supply timing is adjusted.

15. The image forming apparatus according to claim 14, wherein the control circuit reduces a conveyance speed of the sheet in a case where the inlet current will exceed the rated value even if the amount of power supplied to the second heater or the supply timing is adjusted and an amount of power supplied to the first heater is reduced.

16. The image forming apparatus according to claim 15, wherein the reducing of the conveyance speed of the sheet includes temporarily suspending image formation on the sheet.

17. The image forming apparatus according to claim 1, wherein:

the control circuit includes:

a first supply mode for quickly increasing the power supply to the second heater; and a second supply mode for gradually increasing the power supply to the second heater, and the control circuit controls the second heater:

in the first supply mode in the case where the inlet current is not greater than the first threshold; and in the second supply mode in the case where the inlet current is greater than the first threshold.

18. The image forming apparatus according to claim 1, wherein:

the control circuit includes:

a first control unit that controls the power supplied to the first heater; and a second control unit that controls the power supplied to the second heater, and in a case where the inlet current detected by the first detection circuit is greater than the first threshold, the first control unit instructs the second control unit to adjust the power supply to the second heater to stop the inlet current from exceeding the rated value.

19. The image forming apparatus according to claim 18, wherein the instructing to adjust the power supply to the second heater includes at least one of:

adjusting an amount of power supplied to the second heater; or delaying timing of a start of power supply to the second heater.

20. The image forming apparatus according to claim 1, wherein the booklet manufacturing unit includes:

a loading plate on which the plurality of sheets are loaded;

the second heater that heats an adhesive toner image formed on any one of the plurality of sheets loaded on the loading plate; and a pressing plate that presses together the plurality of sheets.

21. An image forming system including an image forming apparatus and a post-processing apparatus detachable from the image forming apparatus, wherein:

the image forming apparatus includes:

an image forming unit that forms an image on a sheet using toner; and a fixing unit including a first heater that fixes the image to the sheet, the post-processing apparatus includes:

a booklet manufacturing unit that manufactures a booklet by heating a plurality of sheets that have passed through the fixing unit using a second heater and bonding together the plurality of sheets, the image forming apparatus further includes:

an inlet through which power is supplied to the first heater and the second heater;

a first detection circuit that detects an inlet current flowing through the inlet; and a control circuit that controls the power supplied from the inlet to the first heater and the second heater, wherein the control circuit:

adjusts the power supplied to the second heater so that the inlet current does not exceed a rated value on a basis of the inlet current detected by the first detection circuit; and timing of power supply to the second heater so that the inlet current does not exceed the rated value in a case where the inlet current is greater than a first threshold less than the rated value, and wherein the adjusting timing of power supply to the second heater includes delaying the timing of power supply to the second heater.

* * * * *